US011236499B1

(12) United States Patent
Raynor

(10) Patent No.: US 11,236,499 B1
(45) Date of Patent: *Feb. 1, 2022

(54) APPARATUS AND METHOD FOR REMOVING DEBRIS FROM WATER MANAGEMENT SYSTEMS

(71) Applicant: Matthew E. Raynor, Banner Elk, NC (US)

(72) Inventor: Matthew E. Raynor, Banner Elk, NC (US)

( * ) Notice: Subject to any disclaimer, the term of this patent is extended or adjusted under 35 U.S.C. 154(b) by 152 days.

This patent is subject to a terminal disclaimer.

(21) Appl. No.: 16/380,798

(22) Filed: Apr. 10, 2019

Related U.S. Application Data

(63) Continuation of application No. 15/179,955, filed on Jun. 10, 2016, now Pat. No. 10,294,654, which is a continuation of application No. 13/800,586, filed on Mar. 13, 2013, now Pat. No. 9,388,560.

(60) Provisional application No. 61/730,878, filed on Nov. 28, 2012, provisional application No. 61/620,378, filed on Apr. 4, 2012.

(51) Int. Cl.
*E03F 5/14* (2006.01)
*B01D 29/96* (2006.01)
*B01D 35/02* (2006.01)
*B01D 29/44* (2006.01)

(52) U.S. Cl.
CPC .............. *E03F 5/14* (2013.01); *B01D 29/445* (2013.01); *B01D 29/96* (2013.01); *B01D 35/02* (2013.01)

(58) Field of Classification Search
CPC .......... B01D 35/02; B01D 35/027; E03B 5/14

USPC ............................ 210/170.03, 459, 460, 462
See application file for complete search history.

(56) References Cited

U.S. PATENT DOCUMENTS

| | | |
|---|---|---|
| 530,816 A | 12/1894 | Wright |
| 664,945 A | 1/1901 | Guion |
| 819,720 A | 5/1906 | Brunotte |
| 1,371,143 A | 3/1921 | Bradburn |
| 1,773,576 A | 8/1930 | Downes |
| 1,910,860 A | 5/1933 | Sayers |
| 1,967,050 A | 7/1934 | Brackett |
| 2,615,526 A | 10/1952 | Lane |
| 3,289,840 A * | 12/1966 | Kahn ................... A01M 29/30 210/131 |
| 3,461,803 A | 8/1969 | Johnson |
| 4,128,477 A | 12/1978 | Nebolsine |
| 4,247,395 A | 1/1981 | Halishak |
| 4,289,619 A | 9/1981 | Sampson |
| 5,779,888 A | 7/1998 | Bennett |
| 5,902,477 A | 5/1999 | Vena |
| 5,904,842 A | 5/1999 | Billias et al. |
| 6,106,707 A | 8/2000 | Morris et al. |

(Continued)

*Primary Examiner* — Benjamin M Kurtz
(74) *Attorney, Agent, or Firm* — Wolff Law Offices PLLC; Kevin Alan Wolff

(57) ABSTRACT

The present invention is directed to a debris catching and removing apparatus and method. For example, bar screens or grids for collecting and removing trash or debris from storm, waste water, or sewage systems, and mounting systems and methods therefore are provided. These apparatus and method may provide a long-lasting, light-weight, and low-cost debris screen screening solutions for removing trash or debris from, for example, storm, waste water, or sewage systems. The invention may be particularly applicable to small lift stations that use submersible pumps or surface mounted pumps that suction waste water from a wet well.

20 Claims, 22 Drawing Sheets

(56) References Cited

U.S. PATENT DOCUMENTS

| | | | |
|---|---|---|---|
| 6,126,821 A | 10/2000 | Corcoran | |
| 6,231,757 B1 | 5/2001 | Huber | |
| 6,254,770 B1 | 6/2001 | Remon | |
| 6,913,690 B2 | 4/2005 | Mattox | |
| 7,135,109 B2 | 11/2006 | Wilcher | |
| 7,220,361 B2 | 5/2007 | Seidl | |
| 7,404,892 B2 | 6/2008 | Shaw et al. | |
| 7,837,869 B2 | 11/2010 | Peters, Jr. et al. | |
| 8,955,539 B2 | 2/2015 | Early et al. | |
| 9,388,560 B2 * | 7/2016 | Raynor | B01D 35/02 |
| 10,294,654 B1 * | 5/2019 | Raynor | B01D 35/027 |
| 2006/0193955 A1 | 8/2006 | Bove | |

\* cited by examiner

APPARATUS AND METHOD FOR REMOVING DEBRIS FROM WATER MANAGEMENT SYSTEMS

This application claims priority to, and is a continuation of, U.S. patent application Ser. No. 15/179,955, filed on Jun. 10, 2016, now U.S. Pat. No. 10,294,654, which is a continuation of U.S. patent application Ser. No. 13/800,586, filed on Mar. 13, 2013, now U.S. Pat. No. 9,388,560 that issued on Jul. 12, 2016, which claims benefit of U.S. Provisional Patent Application No. 61/620,378, filed Apr. 4, 2012 and U.S. Provisional Patent Application No. 61/730,878, filed Nov. 28, 2012. These prior patent applications are hereby incorporated by reference for all purposes.

TECHNICAL FIELD

This invention relates to bar screens or grids for collecting and removing trash or debris from storm, waste water, or sewage systems. In particular, the present invention relates to providing a long-lasting, light-weight, and low-cost bar screen solution for removing trash or debris from storm, waste water, or sewage systems. For example, the invention may be particularly applicable to small lift stations that use submersible pumps or surface mounted pumps that suction waste water from a wet well. This device is designed to screen debris from the waste stream to protect these pumps from mechanical failure.

BACKGROUND OF INVENTION

Water management, and particularly storm water or waste water in its nature is dirty and it does carry loads of biological waste, but also inherently carries lots of inorganic waste in the form of plastics, fibers and other foreign objects that unfortunately on occasion enter the system, by, for example, being flushed down the toilet. These objects are not bio-degradable and must at one time or another be separated from the water and/or waste stream prior to pumping and/or biological treatment. Many times these items end up in, for example, lift stations that serve a vital function in the water management collection system.

Lift stations are typically low spots in a water management or waste water collection system. These stations "lift" the water or waste water back to a higher elevation to, for example, a manhole, to continue on its journey to the point of disposition (such as a waste treatment facility) or may be piped directly to the water facility. Most have two or more pumps, some surface mounted, most submerged directly in the waste water. Very large lift stations, generally those that have flows greater than 100,000 gallons a day, have, for example, an automated mechanical, motor-driven bar screens built prior to the entry of the station designed to continuously and automatically remove debris from the waste stream without human intervention except for system repairs and/or preventative maintenance on the system. These pumps are typically very expensive and require designated and significant additional room in the lift station to allow placement of such a device usually in small compounds, e.g., a small fenced in area. They also require a power source and a great deal of maintenance and/or repair.

If there is no such screen to remove foreign objects from the water stream, then the foreign objects are often pulled into the volutes or intakes of these pumps and may be passed through, but are also just as likely to become lodged in the impeller of the pump disabling it or breaking it or the motor driving the pump. These failures and blockages may result in an overflow of the station, and worst, of raw, untreated waste water, in the case of waste water or sewer system(s). The pumps may be broken and unable to be placed back in service once the item is physically dislodged. These sudden stoppages of the pump can stress the electrical motor enough that it fails due to, for example, high amperage overload. Even if the motor has overload protection these stoppages over time may weaken the overloads until they themselves fail. Ultimately these blockages resulting from foreign objects cause the loss of the pump impellor and/or motor, and they must be completely replaced.

The cost for repair and/or replacements are far-ranging because of variation in factors such as size, capacity, availability, application, and/or accessibility. Pumps in small commercial, industrial and municipal lift stations can cost from $1,000-$10,000 each. This is why larger stations, which consequently cost more, may decide to build motor driven, automated mechanical bar screening systems prior to the station. They are there to protect the pumps.

However, there have not been any bar screen type devices designed to be relatively simple, inexpensive, lightweight, long-lasting, and retractable, moveable, or removable allowing for a cost-effective and practical method for removing solid objects such as inorganic debris in a water disposal, accumulation, or treatment system. For example, no practical bar screen device has been designed prior to the present invention to effectively protect small lift stations from pump failure. At times operators and/or maintenance personnel have attempt to kluge together or fabricate on-site some type of inorganic debris catch device, that sometimes included a handle, to stop some of this debris. However, these devices always invariably fail due to poor design and function. Often, the inorganic debris catch design tends to stop too much debris, and tend to act as a dam eventually catching everything that comes out of the pipe(s) and becoming so overwhelmed by material that they break, fail, or fall into the station due to poor fastening or structural strength, thus buckling under the weight. The operator or maintenance person abandons or disposes of these devices eventually, resigning themselves to accepting the previous status quo. As a professional in this field for over 20 years I have experienced and seen this frustration time and time again, these problems were the *nexus* of this invention. This invention uniquely finds the perfect solution in form and function. This uniqueness is in the light weight removable/retractable design. The bar screen is superior to any style of inorganic debris catch device design because, for example, the bars allow for water to flow free through the bars and allow small items such as paper and biological debris. Other designs previously tried tend to encumber waste or water with smaller debris, stopping it as soon as it enters the baskets. The bar screen however allow for the continual flow of water to push smaller debris through the bars or down the length of the bars to accommodate biologically debris passing through while catching debris not appropriate to pass through a pump. This invention is the first to use the design and function of a bar screen and design it for installation and purpose inside the lift station to provide outstanding safe guards for the pump station, and do in a lightweight compact efficient way directly in the station without expensive alterations, automation, or mechanical equipment.

Although pump manufacturers have designed some pumps with grinders integrated in their housing to cut and grind up the foreign material, these "grinder" pumps work only so well and eventually fall prey to the same issues that normal solid handling pumps do. Nothing as of yet has been designed to remove the debris in these small systems until the creation of the present invention.

SUMMARY OF INVENTION

The present invention is designed for these smaller water handling systems, such as waste water or storm water systems, and is particularly useful for pump stations in lower volume sewer systems or lower volume sections of larger sewer systems. The present invention may include a long-lasting, lightweight, low cost, easy to install, and retractable, moveable, and/or removable debris catching mechanism, e.g., a bar screen type device, that may be placed inside an existing lift station without much effort either on the wall of the tank or the pipe itself. In various embodiments, these bar screen devices may be smaller than many, made of light weight material, be easily mounted in a water management system, and relatively inexpensive. In various embodiments, these bar screen devices may be easily maintained by the utility personnel without technical expertise. The bar screen devices may be hinged to allow them to be retracted or transitioned from an horizontal position that will catch debris, to a vertical position in a lift station, so as to allow for service of the lift station and/or pump removal. The bar screen devices may also be place into a mount so it can be easily removed entirely from the lift station for maintenance and cleaning. The screens may be lightweight and long lasting, and may be constructed of, for example, a high density plastic or another plastic like material. This makes them light and easy to install, plus non-corrosive or conductive to electrical current, two desirable characteristics in a highly corrosive atmosphere with electrical wires and switches. Some of the materials may be, e.g., high density plastic, such as PVC (polyvinyl chloride) or some other plastic product to reduce profile, increase versatility and weight. Other material may be used such as ABS (acrylonitrile butadiene styrene), HDPE (High Density Polyethylene), or a polycarbonate resin (e.g., Lexan made by SABIC Innovative Plastics Inc.). These plastics offer different qualities that may enhance production methodology, such as press molding, blown molds or laser cutting. These plastics have qualities that may also reduce weight of bar screen while maintaining rigidity and strength.

The debris catching device may be positioned directly underneath the output pipe opening, allowing waste and/or water to fall through the screen. The screen bars may be separated by, for example, ½" gaps for screening devices for 4"-8" pipes or outfalls in the lift station. They may be, for example, 1" wider on each side than the pipe opening: 4" pipe=6" bar screen, 6" pipe=8" bar screen and so on. In various embodiments, the sides may be, for example, solid but perforated with ¼" holes though these hole may vary in size in respect to the size of the bar screen. These sides may operate to keep debris inside the bar screen device but allow for water to pass through. They may be generally as tall as the pipe is round. For larger pipes the bar screens may be mostly the same, expect the bars may generally extend further away from the output of the pipe to accommodate the higher flow rates and debris collection of larger pipes. The end of the bar screen furthest from the pipe opening may be, for example, solid to stabilize the bars and to collect and remove the debris without deforming, collapsing, bending or breaking. They also may be open to allow for water to flow through them.

The bar screen may be positioned below the pipe approximately 1"-2" and extends away from the pipe opening (P.O.) a minimum of approximately 12": e.g., a 4" pipe outlet (P.O.) having, for example, a 12" long bar screen, 6" P.O. having, for example, a 14" long bar screen, 8" P.O. having, for example, a 16" long bar screen. The bar screen may have a ridge or upturn at its end, to act as a block for any debris to keep it from going off the far end so that the debris will remain in the screen area during various water flow rates. The bar screen may be easily movable or retractable so that it can be moved out of the way. For example, the bar screen may be hinged underneath the pipe opening to allow the bar screen to swing upward and/or sideways or removed completely, and thus out of the way of a worker or the pumps should one need to be removed from the station. The bar screen may then be moved back into position and in some embodiments be locked into position when pump removal is completed.

The debris capture or removal device or bar screen may be designed so that installation is simple and efficient. As such, installing the debris removal device or bar screen may be done using a number of relatively easy installation methods. For example, in various embodiments, one method may use a full circle clamp that fastens the bar screen to an inlet pipe mouth. The bar screen may have a form fitted tang, such as an attachment piece that is shaped to the contour of the pipe. The tang may be integral with the bar screen. It may extend, for example, 4" from the hinged area rearward toward the pipe. In various embodiments, a full circle clamp may be used to secure it to the pipe. The clamp may be constructed so as to have a stainless steel outer shell and a neoprene rubber interior. This helps seal the bar screen's tang against the pipe wall for a firm, secure fit. Another method to install the bar screen if the pipe is not suitable for attachment thereto type installation may be to wall mount the unit. The tang of the bar screen may be fitted with a mounting bracket that is integral to the bar screen. The tang and bracket may fit over the pipe or around the mouth of the pipe, and mount flush to the wall. The bracket may have, for example, six holes in the shape of a hexagon using appropriate anchoring bolts that may bolt directly into the lift station wall. This will provide a solid connection to secure the bar screen. Of course, other methods of easily mounting the bar screen on at least one of its sides to the lift station are possible, but these two are particularly quick and cost effective.

Another embodiment may have a partially machined or fully machined clamp mechanism that may be opened and closed with, for example, bolts either on the side or on top and bottom. It also could be made to open and close with another fastening device, such as clamp, hook or snap. It could be made of the same like material, i.e., high density plastic, such as PVC or some other plastic product to reduce profile, increase versatility and weight. Other material may be used such as ABS, HDPE (High Density Polyethylene), or a polycarbonate resin (e.g., Lexan made by SABIC Innovative Plastics Inc.). These plastics offer different qualities that may enhance production methodology, such as press molding, blown molds or laser cutting. These plastics have qualities that may also reduce weight of bar screen while maintaining rigidity and strength. Other characteristics may include plastics that are heat, chemical or gas resistant due to the harsh atmosphere where they operate. This custom made clamp may have the bolts holes already drilled and sized so it can be mounted directly to, for example, a lift station wall or on the pipe itself. The clamp may have an integral receiver or mounting bar that may accept the detachable, removable bar screen easily and readily from above, outside the lift station. The bar screen and receiver may be made to seat and unseat smoothly using the mounting bar to act as a seating area for the bar screen. The seat may have guides to afford an easy attaching area. The bar screen may be fashioned to allow for easy placement or seating with the mounting bar receiver area that may be attached to the clamping mechanism. Wide at the opening and narrowing to the exact specific mounting bar measurement in the receiver to make a tight (yet easy) fit for security.

The removable bar screen may include a handle type arrangement that has a cross member with a grove for ease of removing or installing the removable bar screen. The bar screen may also have side panels that have perforated holes and integral handle attachment bars or members to which the cross member may be attached. These integral handle attachment bars or members may help reduce the amount of manufacturing assembly and ease of reconfiguration in the case that the bar screen width is varied after initial manufacturing assembly (as described more below).

A still further embodiment may include a bar screen that has an adjustable and/or variable width, that may be, for example, set during manufacturing assembly to one width based on it mating to a first pipe opening width and related collar size, and later varied if necessary to fit a different size pipe outlet and collar size. This may be achieved by using a plurality of individual spacers between the respective bars and the outside walls of the bar screen. The spacers, individual parallel bars, and parallel side walls may be held together with, for example, threaded bars or long bolts and nuts. The bar screen width adjustment may be varied as needed at, for example, the manufacturing plant or a wholesaler when an order is received for a bar screen and collar to fit a pipe of a diameter different than those that are in inventory, of in the field when an operator wishes to place the bar screen on a wider pipe or a pipe with higher output flow. In any case, this adjustable or variable width bar screen design may help with reducing inventory and cost, and improve flexibility in manufacturing, in this supply chain and/or in the field so that one size individual bar may be used for all of the plurality of parallel bars of the bar screen or used in any number of bar screens, and the bar screen width may be easily varied at any time, from the point of initial manufacturing assembly up until the bar is completely worn out during use.

A retrieval mechanism, for example, a retrieval hook may be fashioned to fit easily and securely into the handle at, for example, a hook groove formed in the handle, to make removal of the bar screen section easy from, for example, atop a lift station or at a distance from where the bar screen is mounted. It could be made from the same material that the bar screen is made from or from some other material such as steel or aluminum. The retrieval hook may be made to fit, for example, most 1.25 inch pipe such as a pool cleaning pole, a telescoping boat docking hook pole, or a simple pipe. It could also be tapped to accommodate a threaded male fitting found on other various extension poles that may be used for painting or washing. This would accommodate a long reach, for example, reaching inside the lift station from outside a lift station access door. The pool pole, telescoping boat hook pool, or pipe may be lengthen or shorten to meet the specification of the activity on site.

BRIEF DESCRIPTION OF ILLUSTRATIONS

The objects, features and advantages of the present invention will become more readily apparent to those skilled in the art upon reading the following detailed description, in conjunction with the appended drawings, in which.

Figure 21:
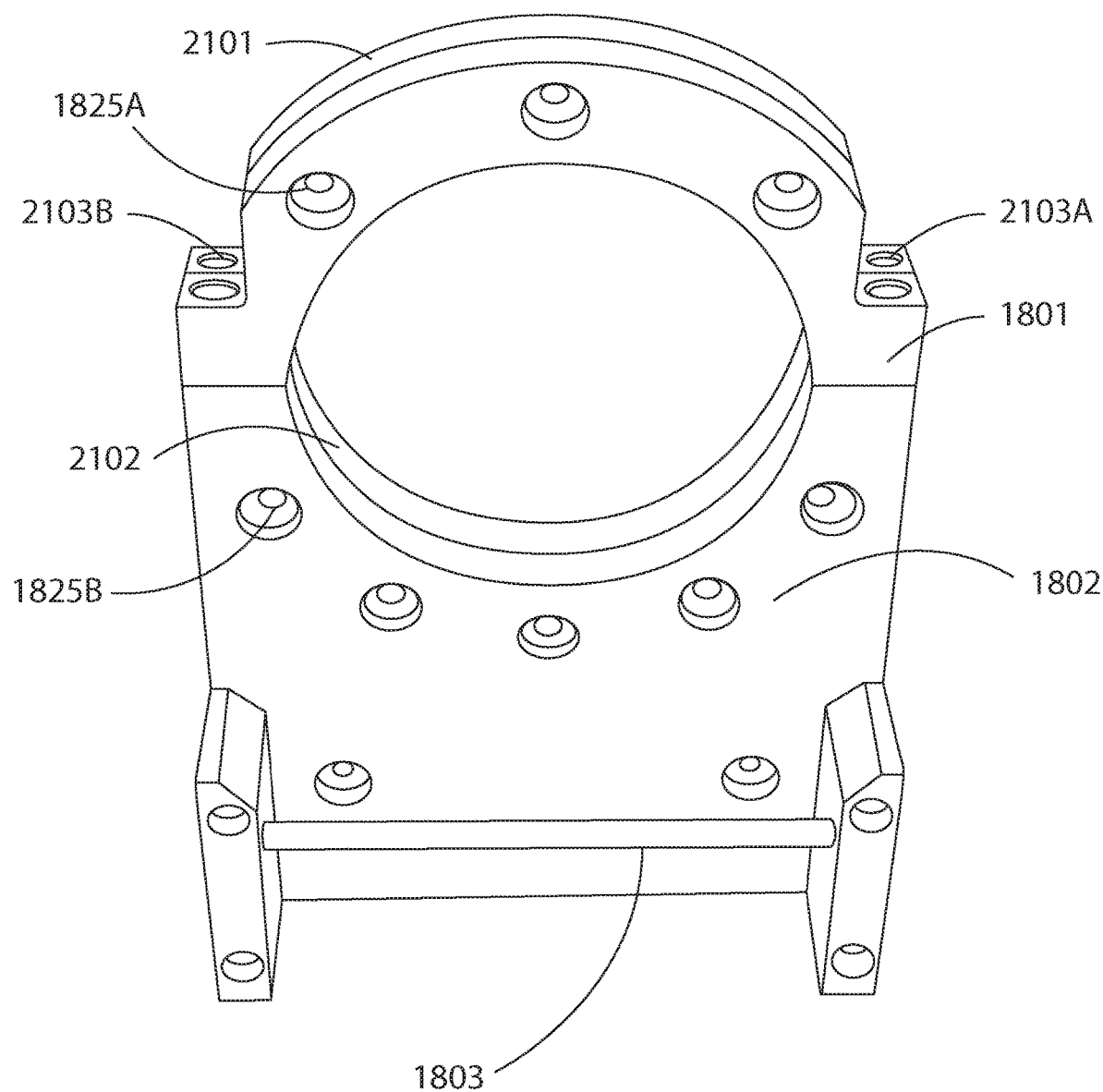
Figure 22:
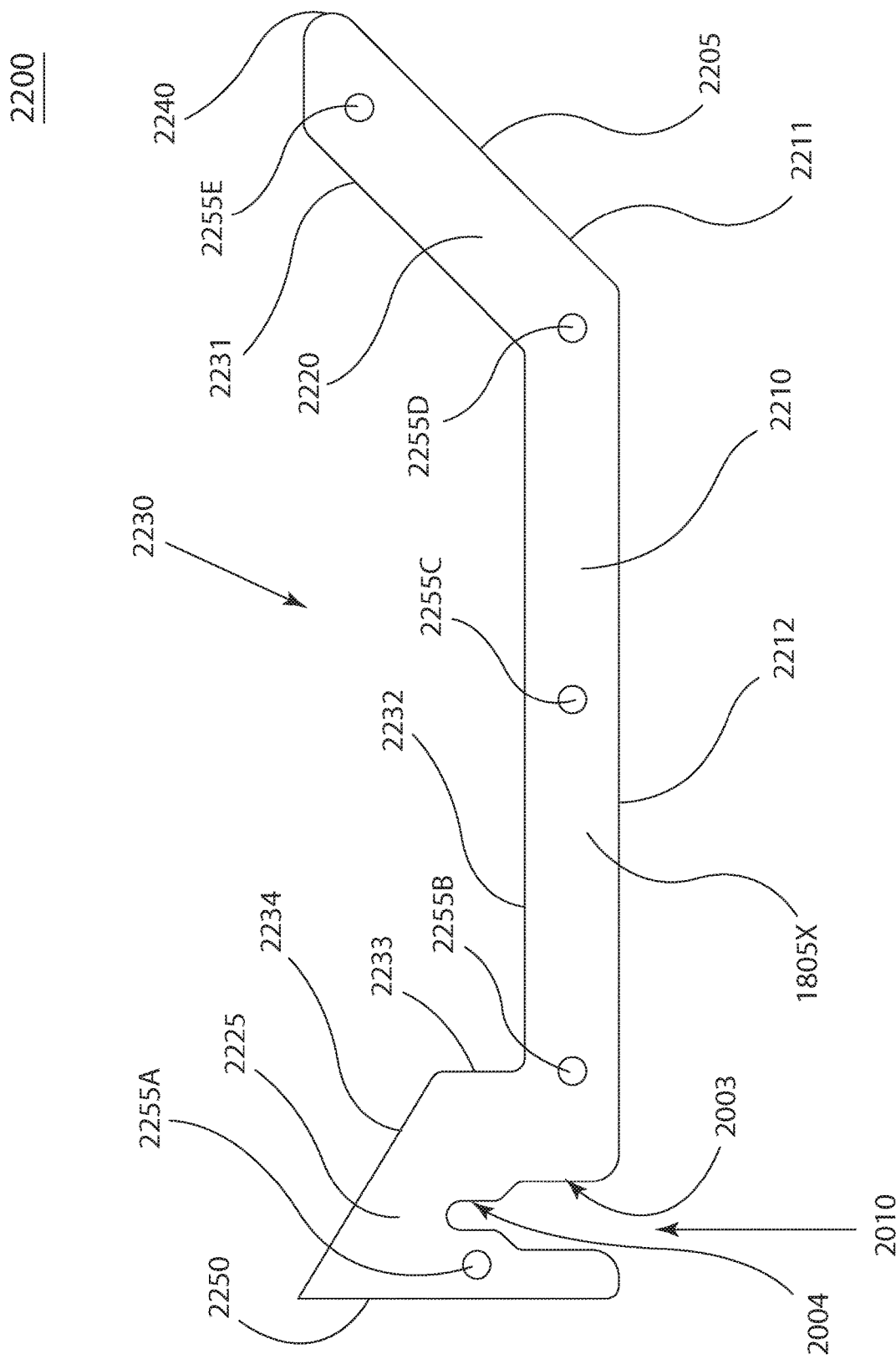

FIG. 21 shows a perspective view of including an ancillary mounting collar bracket(s) for extending the mounting collar for a more secure clamp fit to an inlet pipe, according to one exemplary embodiment of the present invention; and FIG. 22 shows a side view of one of the internal bars of the bar screen not attached to the bar screen yet, according to one exemplary embodiment of the present invention.

DETAILED DESCRIPTION OF THE INVENTION AND ILLUSTRATIONS

Figure 1:
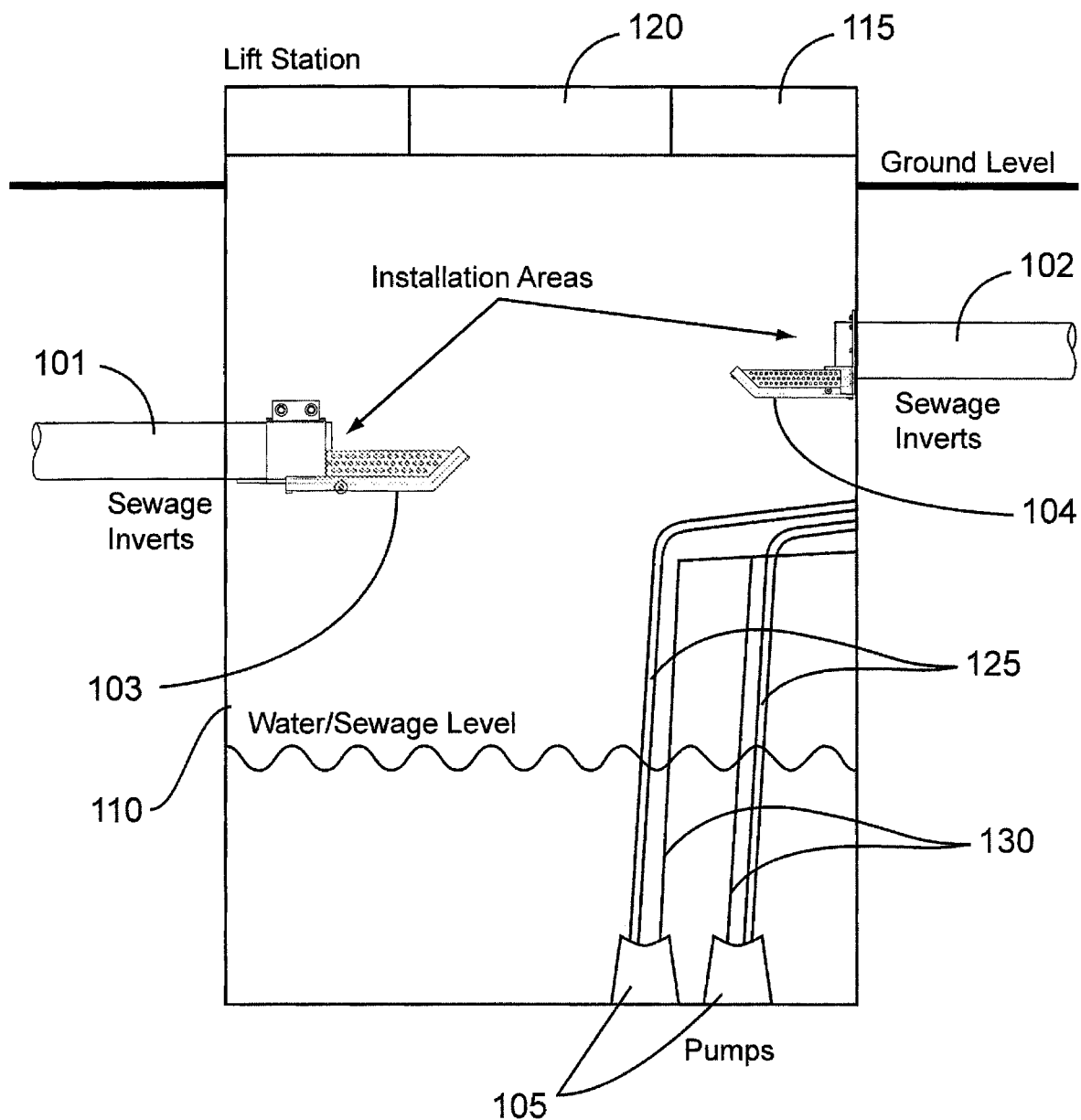
FIG. 1 shows a typical lift station retractable bar screen installation, according to at least one exemplary embodiment of the present invention.

Waste water (e.g. sewage) from homes and businesses, as well as storm water from storm drains in land developments, may flow to collection systems in the case of community sewer and storm drain systems. These systems generally flow by gravity but if topography dictates these flows must be moved to their treatment systems or disposition systems by mechanical means. In most waster or storm water systems these mechanical systems include what is referred to as "lift stations" where the waste water or storm water accumulates in a temporary collection or storage tank or basin, and a system of one or more pumps is used to pump and move or lift the waste to higher elevations to flow by gravity to or directly into a treatment facility. FIG. 1 depicts a cut-a-way illustration of one example of a lift station with various possible embodiment of the present invention. These lift stations are collection points for all the waste debris that is carried along with liquid waste, and some of the waste or debris cannot be naturally broken down by movement and organic processes. These non-biodegradable components of the debris or waste are prone to damage the pumps located in these lift stations. This material may contain, for example, plastics or metals which cannot easily pass through the pumps, and may damage or break the pumps or motors running the pumps.

In general, the present invention is particularly well suited for smaller tributaries or portions of a larger waste water or storm water management system or smaller waste and/or water handling systems, such as waste water or storm water systems, and is particularly useful for pumping or lift stations in lower volume sewer systems or lower volume sections of larger sewer systems. The present invention may include a debris catching and removal system that may be a long lasting, lightweight, low cost, easy to install, and/or retractable debris catching mechanism. Herein, this debris catching and removal system may include a bar screen type device that may be placed inside, for example, an existing lift station without much effort. The debris catching system or bar screen may be preferably installed in the lift station on, for example, either the wall of the tank or basin or on an inlet pipe itself (see, for example, FIGS. 1 and 10). Although, depending on the design and location of the inlet pipes and for example the outlet pipes, the debris catching device or bar screen may be able to be mounted in other locations in the lift station tank or basin, such as on an outlet pipe, as long as the incoming water including waste and debris will flow into the debris catching device. In various embodiments, these bar screen devices may be smaller in size than those presently known, made of light-weight material, easily mounted in a water management system, and relatively inexpensive. In various embodiments, these bar screen type devices may be easily maintained by the utility personnel without technical expertise. The bar screen type devices may be hinged to allow them to be retracted or transitioned from a horizontal position that will catch debris, to a vertical position in a lift station, so as to allow for easier access into the tank or basin to, for example, service the lift station and/or pump removal. The screens may be lightweight and long lasting, and may be constructed of, for example, a high density plastic. This makes them light and easy to install, plus non-corrosive or conductive to electrical current, two desirable characteristics in a highly corrosive atmosphere with electrical wires and switches.

More specifically, referring now to FIG. 1, according to various embodiments of the present invention, a lift station 100 is illustrated and includes a couple of exemplary embodiments of the present inventions bar screen 103 and 104 as shown. The lift station 100 may include a basin 110 into which storm water, waste water, and/or sewage enters via collection pipes 101 and 102. The lift station may include a cap 115 and an access hole and door 120. The collection or inlet pipes 101 and 102 that transport the waste to the stations may pass through the debris-removing device or bar screen 103 & 104 which may catch various non-degradable materials before they enter the lift station basin 110 and/or pumps 105. The bar screens 103 and 104 may be retractable and may be mounted in different sewage pipe 102 and 103 configurations using different mounting hardware configuration. For example, if the pipe 101 enters the station and has a portion greater than, for example, 6" protruding from the wall surface, the retractable bar screen (RBS) may be mounted onto the inlet pipe 101 itself using a bar screen 103 with a full circle clamp or band clamp configuration. Conversely, if the inlet pipe 102 enters the lift station with less than approximately 6" protruding from the wall surface, a wall mounted flange type configuration RBS 104 may be preferably installed. The pumps 105 may be used to pump sewage from the lift station using pipes 125 and may be electrically connected with power cords 130.

In various embodiments, the debris catching device or bar screen 103 and 104 may be positioned directly underneath the output of inlet pipe 101 or 102 opening allowing waste and/or water to fall through the bar screen 103 or 104. The screen bars may be separated by, for example, ½" gaps for screening devices for 4"-8" pipes or outfalls in the lift station 100 (see, for example, gaps between 405A and 405B in FIG. 4). The bar screen 103 or 104 debris catching structure or screen portion (e.g., 403) may be, for example, 1" wider on each side than the pipe 101 or 102 opening or mouth: 4" pipe=6" wide bar screen, 6" pipe=8" wide bar screen and so on. In various embodiments, the side structure of the bar screen 103 or 104 may be, for example, a solid but perforated with ¼" holes (see, for example, 315A in FIG. 3). These sides may operate to keep debris inside the bar screen 103 or 104 device but allow for water to pass through. They may be approximately one half as tall as the pipe is round, or greater in height. For larger diameter inlet pipes 101 or 102 the bar screens 103 or 104 may be mostly the same structural design with variation to account for different water or sewage flow rates or mounting methods and locations. For example, the bars may generally extend further away from the output of the pipe to accommodate the higher flow rates and debris collection related to larger pipes and/or mounting approximately at the same location as the output mouth or opening of the inlet pipes 101 or 102 (e.g., bar screen 103s structure being larger than bar screen 104 structure). Appropriate sizing of the bar screen 103 or 104 will help ensure that most or all of the non-biodegradable debris that comes out of the inlet pipes 101 or 102 are caught in the bar screen 103 or 104, and do not fall into the water or sewage retained in the bottom of the flow station 100 collection/storage tank or basin 110.

As illustrated in FIG. 1, the length and overall size of the bar screen 103 or 104 may vary, and in various embodiments the size may be related to the size diameter of the inflow pipe 101 or 102 it is associated with or the type of mounting system and location relative to the end of the outlet of inlet or inflow pipe 101 pr 102 extending into the collection/storage tank or basin 110. In general the bar screen 103 or 104 length may be at least 2 times the diameter of the outlet pipe. For example, the bar screen 103 having a band or circular clamp attachment mechanism (see FIGS. 2-6), may be positioned approximately or directly below the inlet pipe 101 or 102 opening or mouth, and may extend away from the inlet pipe opening or outlet (P.O.) a minimum of approximately 14": e.g., a 4" pipe outlet (P.O.) having, for example, a 14" long bar screen, 6" P.O. having, for example, a 16" long bar screen, 8" P.O. having, for example, a 18" long bar screen. For another example, the bar screen 104 using a collar and bolt wall mount may be positioned below the pipe opening or mouth approximately 1"-2" and extend away from the inlet pipe opening or outlet (P.O.) a minimum of approximately 12": e.g., a 4" pipe outlet (P.O.) having, for example, a 12" long bar screen, 6" P.O. having, for example, a 14" long bar screen, 8" P.O. having, for example, a 16" long bar screen.

The debris removal device or bar screen 103 or 104 may be designed so that installation is simple and efficient. As such, installing the debris removal device or bar screen 103 or 104 may be done using a number of relatively easy installation designs and methods. For example, in various embodiments, one design and method may use a full circle or band clamp, like the one shown in FIG. 1 with debris removal device or bar screen 103, that fastens the bar screen to an inlet pipe 101 length from the tank or basin 110 inner wall to the mouth of the inlet pipe 101, as long as the inlet pipe 101 length extending from the tank or basin 110 inner wall is sufficient enough to attach and hold the full circle or band clamp. As previously noted, the debris removal device or bar screen 103 or 104 may be easily movable or retractable so that it can be moved out of the way; thus a Retractable Bar Screen (RBS). For example, the debris removal device or bar screen 103 or 104 may be hinged underneath the pipe opening to allow the bar screen to swing upward and/or sideways, and thus out of the way of a worker or the pumps should one need to be removed from the station. Preferably the RBS 103 or 104 is hinged to swing upward so that it will generally be easier to automatically return to its horizontal position directly underneath the inlet pipe 101 or 102 mouth. In either case, the RBS 103 or 104 may then be moved back into position. In various embodiments the RBS 103 or 104 may be locked into position when pump removal or basin maintenance is completed. A more detailed description of the type of debris removal device or bar screen 102 with a full circle or band clamp attachment design and method follows with reference to FIGS. 2-6.

Figure 2:
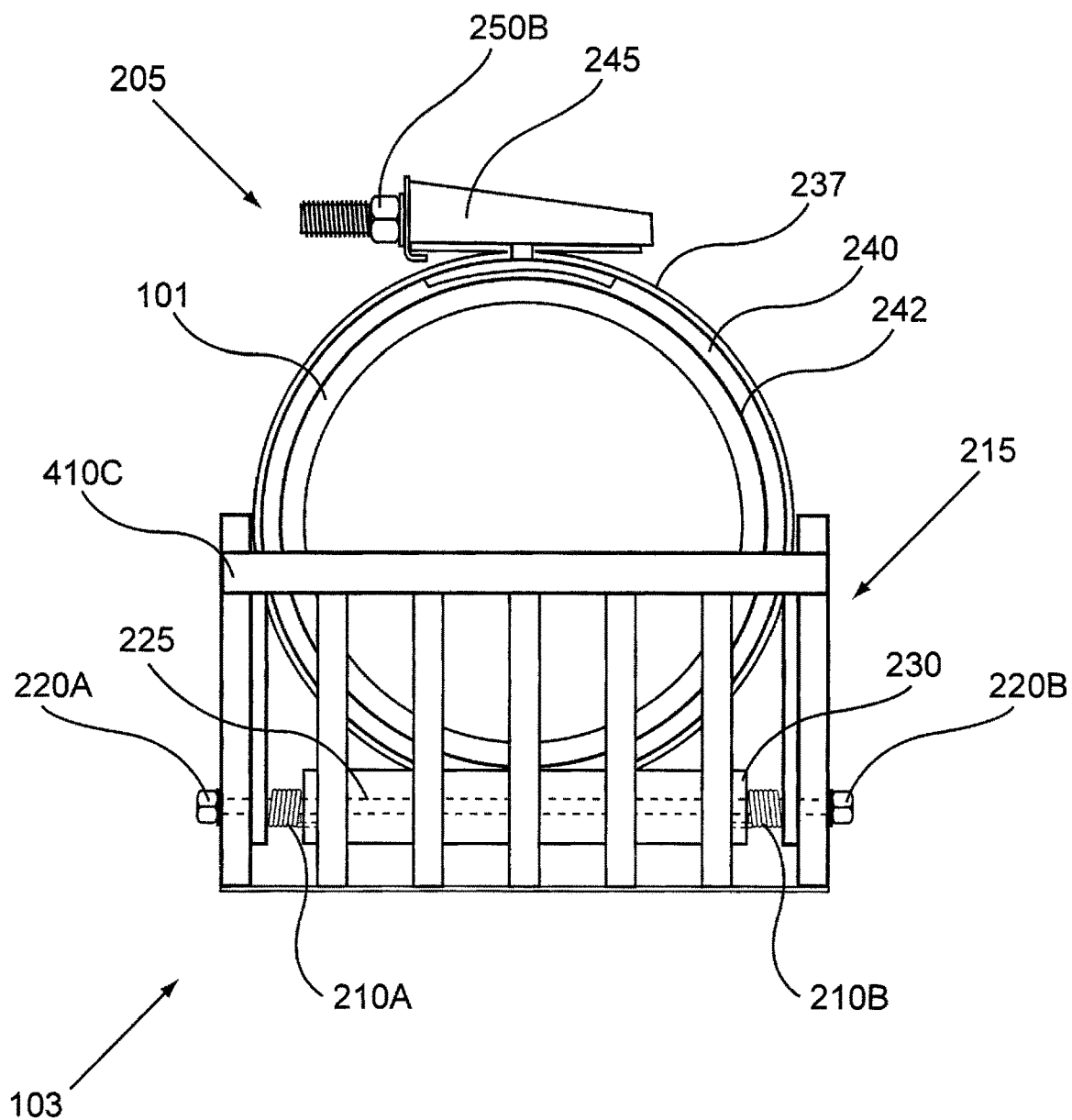
FIG. 2 shows a front view of a pipe mounted retractable bar screen, according to at least one exemplary embodiment of the present invention.

Referring now to FIG. 2, according to various embodiments of the present invention, a front view 200 of one exemplary embodiment of a retractable bar screen (RBS) 103 when it is mounted with a full circle clamp (FCC) or band clamp 205 on the pipe 101, is shown. The RBS 103 as viewed, may have an upturned front section 215 that covers, for example, approximately half or more of the opening or mouth of the inlet pipe 101. This upturned front section 215 (along with the sides 315A and 315B of the RBS 103 shown in FIGS. 3-6) allows for the non-organic material to stay on or within the RBS 103 screen portion and not be washed off the end or sides thereof. In various embodiments, this far end 215 of the bar screen 103 may be, for example, solid (rather than formed with ends of the bars) to stabilize lateral bottom bars and to collect and remove the debris without deforming, collapsing, bending or breaking (not shown herein). The retractable bar screen (RBS) 103 may further include a threaded rod or bolt and nut(s), studs and nuts, or studs 220A, 220B and 225, that attach the screen portion to a mounting bracket 230 with, for example, a tang (see 310 in FIG. 3), and may provide a pivot point for the RBS 103 screen portion so as to enable it to be easily retractable permitting easy access to the lift station tank or basin 110 where the lift pumps 105 and contained waste water or sewage are located.

Various embodiments of the RBS 103 may include springs 210A and 210B, which may help keep tension on the RBS 103 screen portion (e.g., includes front section 215, elongated bottom bar grid 310A—310B, and perforated sides 315A and 315B) and attachment structure (e.g., tang 310) to reposition the screen to an extended position from the inlet pipe 101 outlet if the screen is moved up to allow, for example, for working access into the lift station tank or basin 110, for removal of a pump 105 from the tank or basin 110. The spring(s) 210A and/or 210B may automatically move the screen back into position after the pump is pulled up past the RBS 103. Of course, the RBS 103 may be designed in a way that the springs may not be needed and gravity is used to return the RBS 103 to its laterally extended position. For example, if the RBS 103 is mounted to the inlet pipe such that the bottom of the screen portion of the RBS 103 cannot pivot up to 90 degrees from its normal horizontal plane when it is in the down position, for example, the pivot travel is limited to say, 85 degrees, by the distal end of the inlet pipe 101 (e.g., by mounting the full circle clamp (FCC) or band clamp 205 on the inlet pipe 101 closer to the wall such that the distal end of the inlet pipe 101 acts to stop the rotation of the RBS 103 screen portion). As such, no springs 210A or 210B are needed. Furthermore, although the embodiments shown herein have two springs for purpose of symmetry, the RBS 103 may be designed with a spacer on one side (left or right) of the screen portion and the other having a tensioning spring 210A or 210B.

The debris removal device or bar screen 103 or 104 may have a ridge or upturned 215 at its end, to act as a block for any debris to keep it from going off the far end so that the debris will remain in the screen area during various water flow rates. A cross bar 410C may be included at the end of the upturn 215 so as to keep the various bars in the RBS 103 and the perforated sides 315A and 315B firmly held together. The cross bar 410C may be located on the outside or underside of the RBS 103 screen portion as shown in FIGS. 1-10, or on the inside or topside of the RBS 103 screen portion. In the inside or topside configuration the cross bar 410C may also help to block any debris to keep it from going of the far end of the RBS 103 or 104, so that the debris will remain in the screen area regardless of increased water flow rates. Furthermore, although the upturn 215 is shown at approximately a 30 degree to 45 degree angle from the horizontal plane of the floor of the RBS 103 screen portion, upturn may be at a greater angle to the plane of the floor, for example 90 degrees, so that the block of any debris is increased or maximized.

The full circle clamp (FCC) or band clamp 205 may have a soft gasket or textured interior to help hold the RBS 103 from sliding off of or rotating about the center axis of the inlet pipe 101. The full circle clamp (FCC) or band clamp 205 may have an exterior band 237 made of a flexible, strong and corrosion resistant material (e.g., some metals, plastics, or fiber or polyester-filled flexible resin). For example, the full circle clamp (FCC) or band clamp 205 may be constructed so as to have a stainless steel outer shell 237 and a neoprene rubber interior 240, that helps seal a portion of the RBS 103 (e.g., the bar screen's tang 310 shown in FIG. 3) against the inlet pipe outer wall surface 242 for a firm secure fit.

Figure 3:
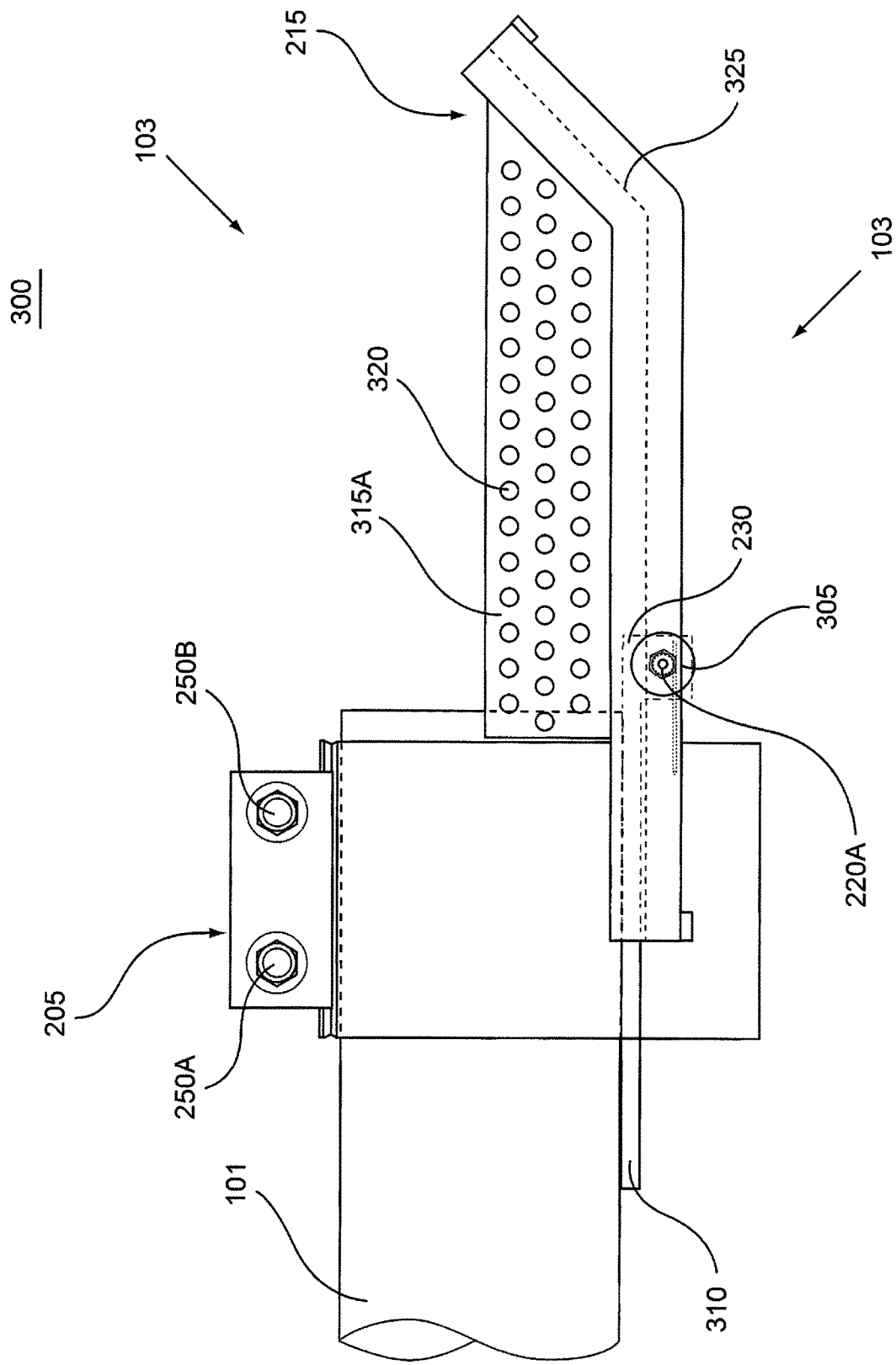
FIG. 3 shows a side view of a pipe mounted retractable bar screen, according to at least one exemplary embodiment of the present invention.

Referring now to FIGS. 2 and 3, the full circle clamp (FCC) or band clamp 205 may also include a diameter adjustment or tightening mechanism 245 with a bolt and nut arrangement 250B (250A not shown in FIG. 2) that helps adjust the circumference and diameter of the full circle clamp (FCC) or band clamp 205 about the inlet pipe 101 so as to hold the debris removal device or bar screen 103 in place upon installation. In this type of attachment design or method, the RBS 103 may include a tang or extension 310 connected to mounting bracket 230, which is coupled to the RBS screen portion via bolt or stud and nut 220A and 220B. The tang or extension 310 may be clamped or compressed to the outside of the inlet pipe 101 by the compression of full circle clamp (FCC) or band clamp 205 by screwing in bolts or nuts 250A and 250B, so as to hold the tang or extension 310 to the inlet pipe 101. The mounting location of the tang or extension 310 and the RBS 103 along the lateral length may vary so long as the screen portion of the RBS 103 does not cause the screen portion to pivot upward out of the way by interference from the innermost portion of the outlet mouth of the inlet pipe 101.

Referring now specifically to FIG. 3, the RBS 103 screen section may include opposite sides or side walls 315A and 315B (not shown) that are, for example, perforated and which assist in the retention of undesirable non-biological materials or debris in the waste water, and drainage. The holes, e.g., 320, may be uniformly spaced and sized for optimal performance and ease of manufacturing. Although, one skilled in the art would appreciate that other methods of designing the sides or wall of the screen section are possible, such as horizontal bars or a mesh screen design. In any case, the sides 315A and 315B (not shown in FIG. 3) are separated by the lateral bars (shown through the left most framing bar via dotted line 325) of the screen section and may be wider than the inlet pipe 101 to allow for a free range of movement on either side when the RBS 103 is moved into the upright or retracted position. Either side of the screen section of the RBS 103 may include the coupling or attachment means for the hinge mechanism, which may include a rod 225 (shown as dotted line in FIG. 2) through the hinge mounting bracket 230, one or more bolts or studs and nuts 220A and 220B, and a washer 305 to hold the screen section to the mounting bracket 230 and tang or mounting bracket extension 310. The tang or mounting bracket extension 310 may be integral to or attached to the mounting bracket 230 using welding, screws, etc. The mounting bracket 230 may be formed in a rounded or squared shape (shown in FIG. 3 to be a squared shape). The tang 310 may extend, for example, 4" or more from the hinged area rearward toward the inlet pipe 101. In various embodiments, a full circle clamp may be used to secure the tang 310 it to the inlet pipe 101, as shown in FIGS. 3 and 4.

Further, the debris removal device or bar screen 103 may have a form fitted tang or mounting bracket extension 310, such as an attachment piece that is shaped to the contour of the inlet pipe 101. So, in various embodiment, one or more sides of the tang or mounting bracket extension 310 may be formed in the radial or rounded shape of the inlet pipe 101 for a better fit to the inlet pipe and the full circle clamp (FCC) or band clamp 205. In various embodiments the inlet pipe side of the tang or mounting bracket extension 310 may include a friction surface, for example a textured surface, protrusions on its surface, or a surface covered with a rubber type material so as to help it remain in the same rotational location on the outer surface of the inlet pipe 101 regardless of the movement of the RBS screen section or the weight or location of the debris materials caught in the RBS 103 when the lift station 100 is in operation.

Figure 4:
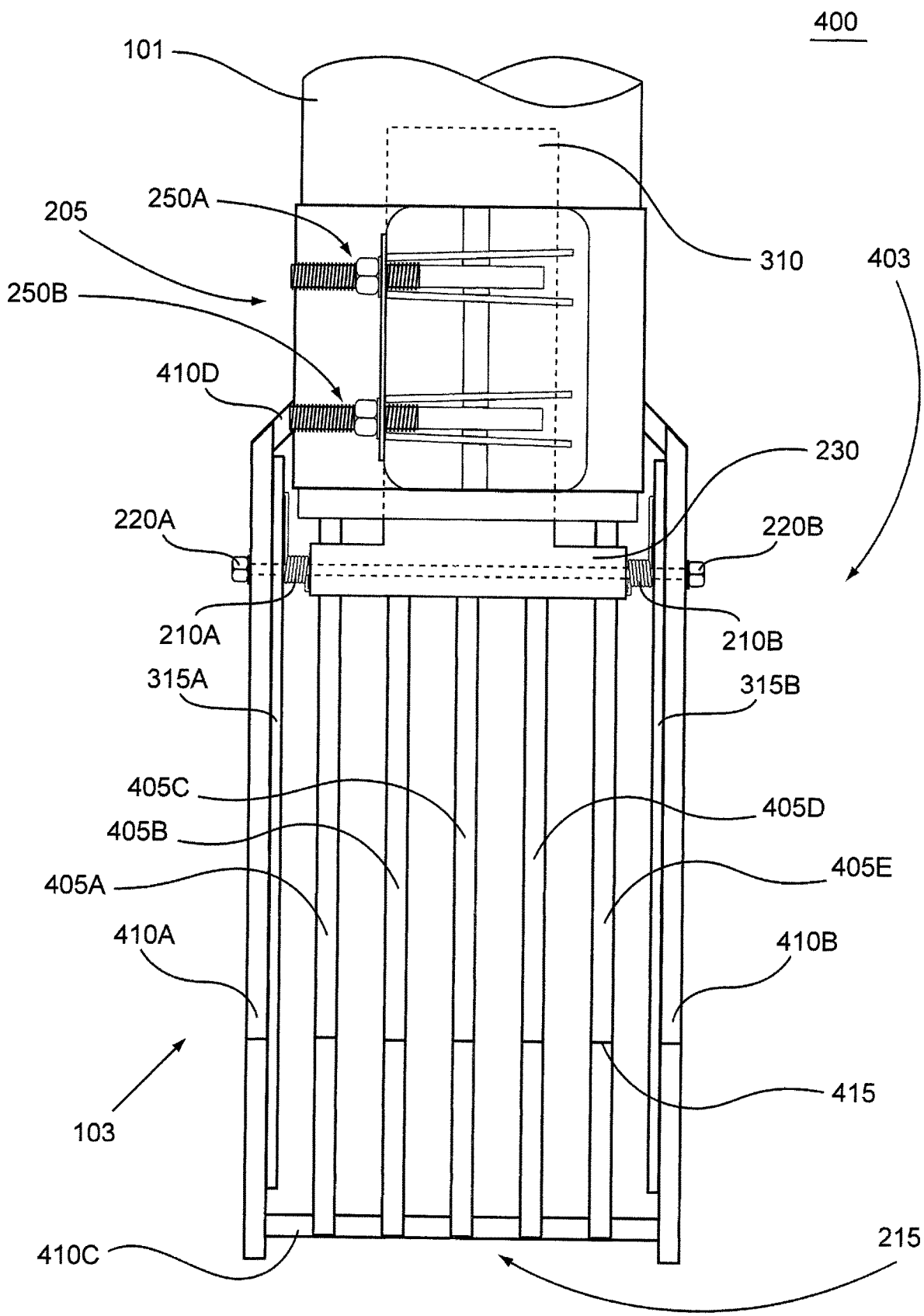
FIG. 4 shows a top view of a pipe mounted retractable bar screen, according to at least one exemplary embodiment of the present invention.

FIG. 4 depicts the RBS 103 attached to the inlet pipe 101 with a FCC 205. The clamp 205 keeps the RBS 103 stabilized on the pipe in the optimum and/or preferred position as determined by, for example, the inlet pipe 101 size, the anticipated flow rate, etc., as would be appreciated and determined by the person installing the RBS 103 in a lift station 100. Ideally, proper installation and positioning of the RBS 103 provides for complete coverage of the flow stream exiting the mouth of the sewage inlet pipe 103. Ideally the tang 310 acts as an adjustable and stable connection point between the outlet pipe 101 and the RBS 103. As illustrated more clearly in FIG. 3, the tang 310 (shown as a dotted line in FIG. 4) may rest underneath and in direct contact with the underside outside surface of the inlet pipe 101. The FCC 205 is tightened around the pipe with the screw bolts as shown in FIG. 4. This type of design and installation is quick and easy and only requires a wrench to tighten the bolts on the FCC 205. The design is simple and compact enough so that it can be installed by one person (e.g., a lift station maintenance person) while the lift station 100 is still in operation, although they may wish to put a temporary cap over the mouth of the inlet pipe 100 (or hope that no one connected to the lift station flushes their toilet during installation).

Figure 5:
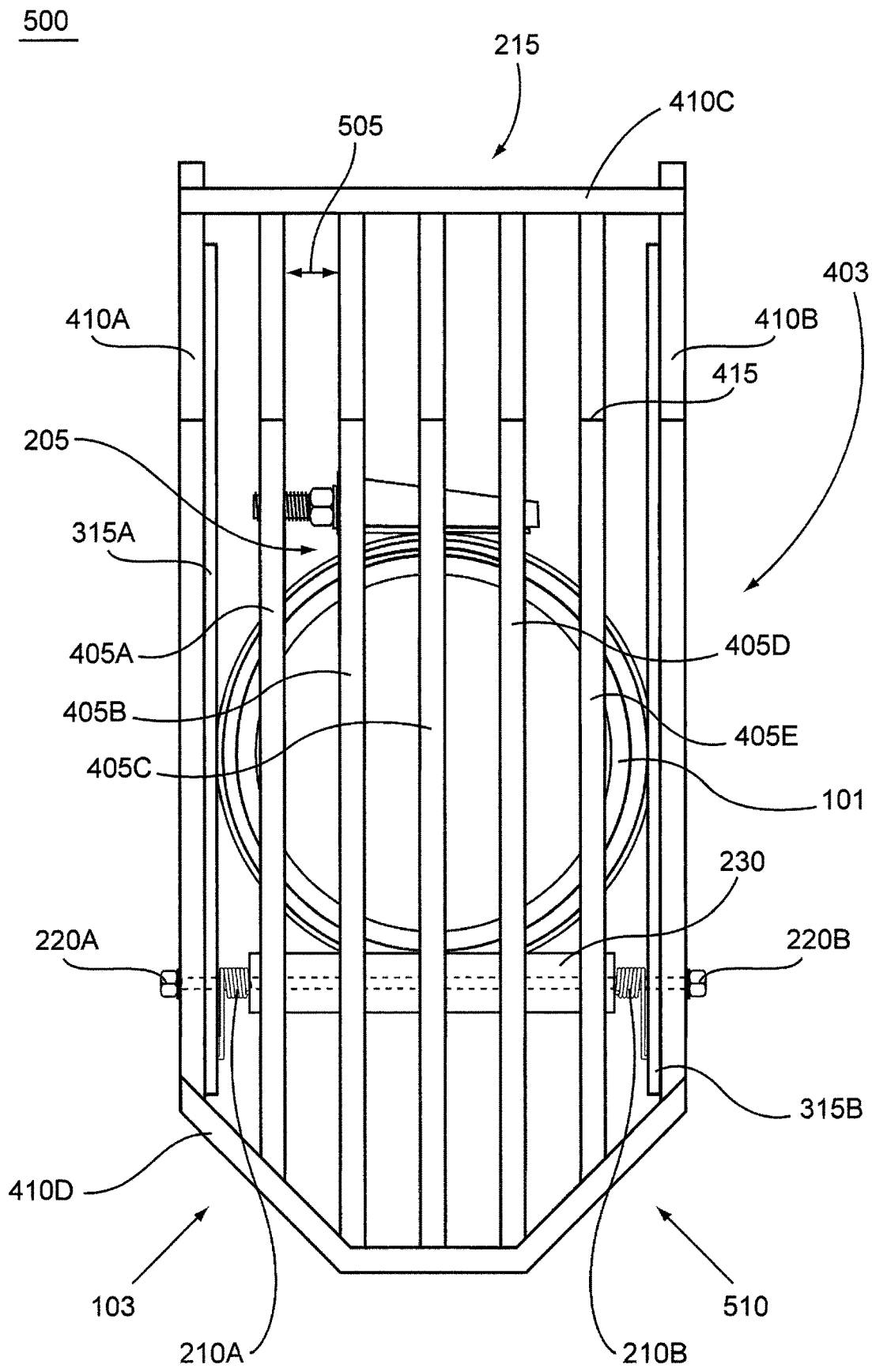
FIG. 5 shows a front view of a pipe mounted retractable bar screen in the upright position, according to at least one exemplary embodiment of the present invention.

FIGS. 4 and 5 show the screen portion 403 of the RBS 103 more clearly, in both the operational position (for collecting debris) that is approximately parallel with the water level or bottom surface of the lift station tank or basin 110 (FIG. 4) and the retracted position (for access to the tank or basin) that is approximately perpendicular to those same surfaces (FIG. 5). The screen portion 403 of the RBS 103 may include a plurality of lateral elongated bars 405A—405E that make up the bottom of the RBS 103 screen portion 403. As mentioned earlier with reference to FIG. 2, these bottom lateral elongated bars 405A—405E may for on their distal ends a front section 215 of the RBS 103 that is turned upward (or at an upward angle) at a far end of the elongated bars 405A—405E, for example, at transition point 415 shown on lateral bars, rod or beam 405E. The bottom lateral elongated bars 405A—405E may be held together in place by a frame portion, in this exemplary embodiment including side or frame bars 410A, 410B, 410C, and 410D. As shown, some of the lateral bars may be longer than others and one or more side or frame bars, e.g. back side or bar 410D, may include one or more angles. The bottom lateral elongated bars 405A—405E may be connected to the frame bars 410A, 410B, 410C, and 410D by being integrally formed using, for example, a molded plastic or molded fiber filled plastic, or be connected together using a standard or custom designed attachment means such as screws, rivets, spring clips, epoxy glues, welding, etc., depending on the type of material being used. In various embodiments, the left and right side frame bars 410A and 410B may be larger and taller than the front frame bar 410C and back frame bar 410D. As previously mentioned, left side frame bar 410A and right side frame bar 410B may have a left side wall 315A and a right side wall 315B attached to them, respectively. Although, one skilled in the art would appreciate that in various alternative embodiments the side frame walls and the side walls may be integrally formed (or even the entire screen portion 403 of the RBS 103 for that matter) or may be preferably the same piece without having any difference in their structures. Further, as mentioned above, although the front frame bar or beam 410C is shown to be formed or attached to the bottom of left side frame bar 410A and right side frame bar 410B in various embodiments it may preferably be formed or attached to the top of the left side frame bar 410A and right side frame bar 410B, or at least on the top of lateral elongated bars 405A-405E, so as to act as a stronger debris stop or dam. Some particular materials that may be used to form the various parts or sides and bars of the screen portion, debris catching device, and/or bar screen may include, e.g., high density plastic, such as PVC (polyvinyl chloride) or some other plastic product to reduce profile, increase versatility and weight. Other material may be used such as ABS, HDPE (High Density Polyethylene), or a polycarbonate resin (e.g., Lexan made by SABIC Innovative Plastics Inc.). These plastics offer different qualities that may enhance production methodology, such as press molding, blown molds or laser cutting. These plastics have qualities that may also reduce weight of bar screen while maintaining rigidity and strength. In any case, the debris collection will occur with the sides walls and front portion 215 acting as three of the four stops for the debris, and the mounting bracket 230 and mouth of the inlet pipe 101 acting as the fourth stop so as to wall in the debris that comes out of the inlet pipe 101.

Further, FIG. 5 shows the RBS 103 in an upright position while mounted on the pipe with clamp 205. The length of the bars 405A—405E on the screen portion 403 accommodates a substantial quantity of the debris collection, although, a small portion of their length on the inward side of the mounting bracket 230 in the lateral direction of the tang 310 (not shown in FIG. 5), may abut against the tang 310 (not shown in FIG. 5) and/or an outer surface of the inlet pipe 101, so as to act as a stop or support for the RBS 103 when the screen portion 403 is in its normal operating horizontal position. The bar openings or gaps width 505 may be set at a distance, for example, approximately ½-1¼ inches, to allow for small bio-solids and liquids to pass through while catching larger inorganic material, such as plastics and fibrous materials. This width will vary depending on the size of the RBS and the pipe size it is affixed to, for example, a four inch pipe and RBS will have narrower gaps 505 between the lateral bars screen openings than a ten inch pipe and RBS. This is important because the larger the pipe, it follows the larger the pumps and the station. Larger pumps can handle larger debris, smaller pipe/pumps the small the debris has to be for it to pass. It is necessary to screen for smaller items with smaller pumps. The bottom lateral elongated bars 405A—405E may have, for example, a width of approximately ¼-¾ of an inch, depending on various factors such as the material that the bars are made of, whether the screen portion 403 is integrally formed, the anticipated weight of material or debris that would be expected to be able to reach the RBS 103 (related to inlet pipe 101 size and system type), etc. And bottom lateral elongated bars 405A—405E may be of various lengths dependent on the size of inlet pipe 101 that the RBS 103 is attached to. As noted above, for example, the base may extend away from the inlet pipe opening or outlet (P.O.) a minimum of approximately 14": e.g., a 4" pipe outlet (P.O.) having, for example, a 14" long bar screen, 6" P.O. having, for example, a 16" long bar screen, 8" P.O. having, for example, an 18" long bar screen. In a preferred embodiment, the screen portion 403 of a RBS 103 intended for a 4 inch inlet pipe outlet size may be approximately 18 inches in length and 6 inches in width, having ¼ inch wide lateral and framing bars separated with ¾ inch openings, that have been integrally molded out of a high density strong fiber filled plastic material that is non-corrosive, electrically insulating, and light weight.

In various embodiments, the RBS 103, or portions thereof, may be made of light-material such as plastic or other non-ferrous materials, and/or light weight or non-corrosive metals. This may help to reduce the weight and corrosion. The RBS 103 can be made by, for example, a mold casting process or other manufacturing alternatives. The back or short end 510 of the RBS screen portion may be designed in a shape and size to fit easily underneath the inlet pipe 101 to give strength and support via leverage to the cantilevered screen portion 403. In FIG. 2, the dotted line 225 through the mount 230 shows the uses of a rod that may act as the hinge and connector of the two sections (the mount 230 and tang 310, and the screen portion 403 of the RBS 103). The rod 225 may be threaded at each end to allow for nuts 220A and 220B to be used to keep the rod 225 in place. A depiction of this is seen in FIGS. 2-6.

Figure 6:
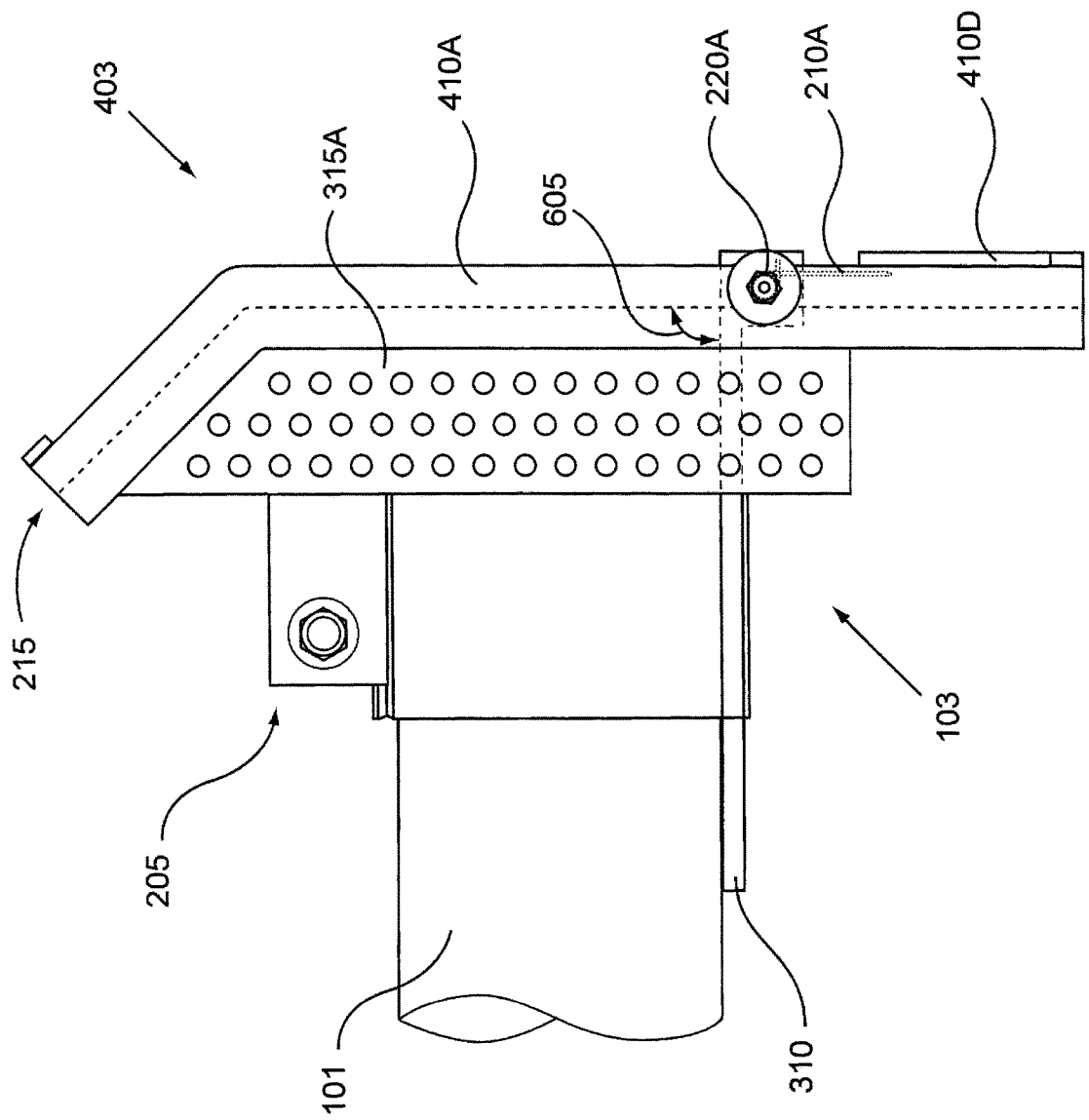
FIG. 6 shows a side view of a pipe mounted retractable bar screen in the upright position, according to at least one exemplary embodiment of the present invention.

Referring to FIG. 6, a side view of at least one embodiment of the present invention with the RBS 103 screen portion 403 in the retracted or upward position is provided. This view provides for a better perspective of how the RBS 103 looks in its retracted or upward pivoted position. In this position, the screen portion 403 may be moved or pivoted about the hinged rod portion with nut 220A to an angle 605 of approximately 90 degrees relative to the plane of the tang 310. In this case, when a spring 210A is included, it has increased tension applied and is pushing back on the screen portion 403 so as to return the screen portion 403 to is normally horizontal or lateral position that is approximately parallel with the direction of inlet pipe 101. As noted before, the clamp 205 and tang 310 may be positioned or mounted so that the mouth or outlet of the inlet pipe 101 does not restrict this movement except when the pivot angle 605 approaches approximately 90 degrees. In various embodiments, the pivot tension spring may not be needed when the pivot angle is limited to approximately 85 degrees or less and gravity is sufficient to return the RBS 103 screen portion 403 back to its normal operating horizontal or lateral position. In either case, this unique pivoting design allows for pumps 105 to be easily removed from below the RBS 103. The springs 210A and/or 210B may be tensioned and/or gravity and weighting of the screen portion 403 in conjunction to proper mounting of the clamp and tang along the lateral distance of the inlet pipe 101, may be used to allow for the RBS 103 to return automatically to operating position after the pumps have passed by or maintenance personnel have completed their work. Thus, the RBS 103 would only be in a position to block the pipe opening for limited amounts of time as necessary, any may never be accidentally or inadvertently left to block the outlet of the inlet pipe 101 for any unknown length of time. This is important to ensure the sewer line flows freely and sewer, waste water, or storm water does not get backed up in the inlet pipe 101.

Figure 7:
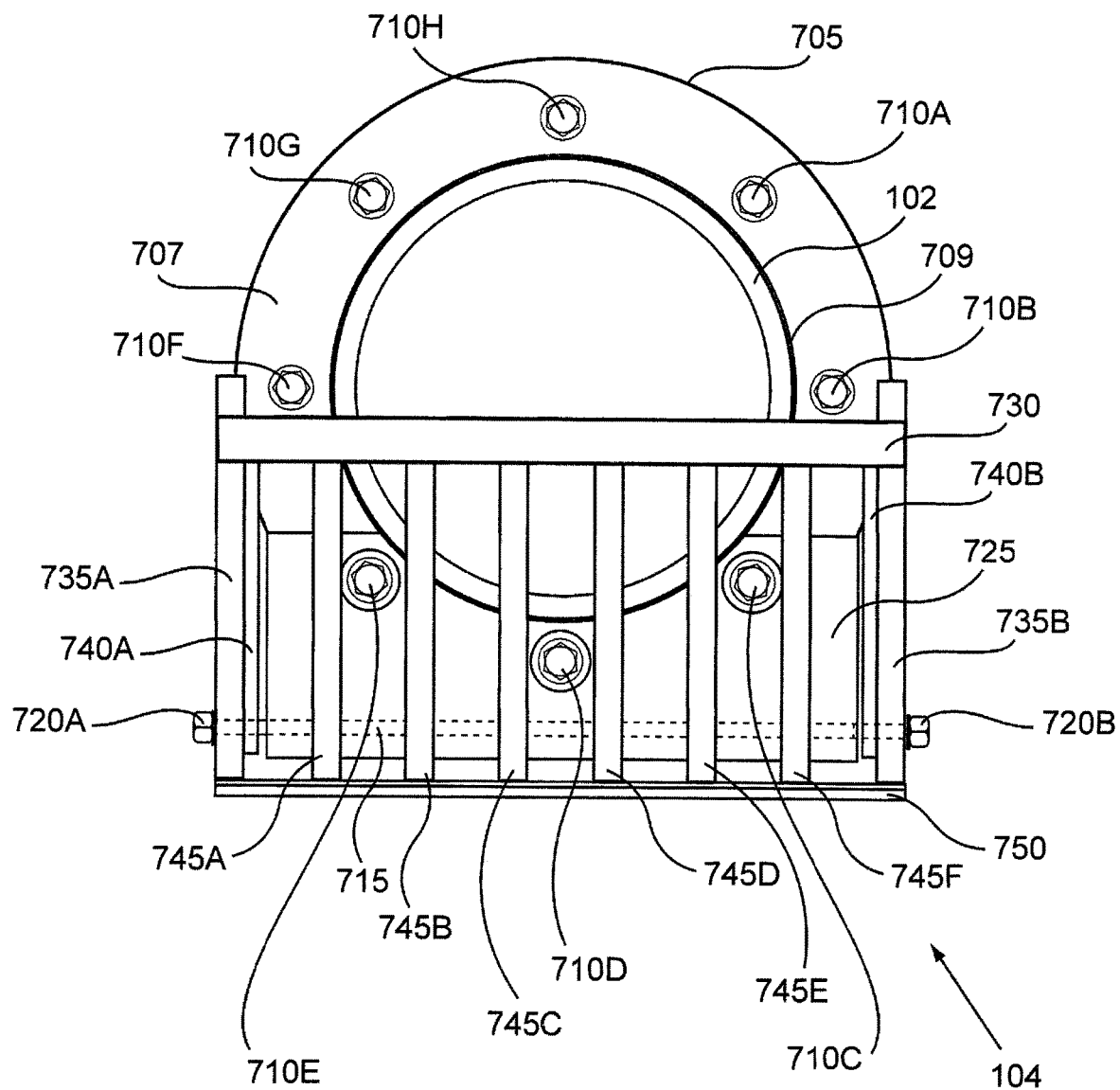
FIG. 7 shows a front view of a wall mounted retractable bar screen, according to at least one exemplary embodiment of the present invention.
Figure 8:
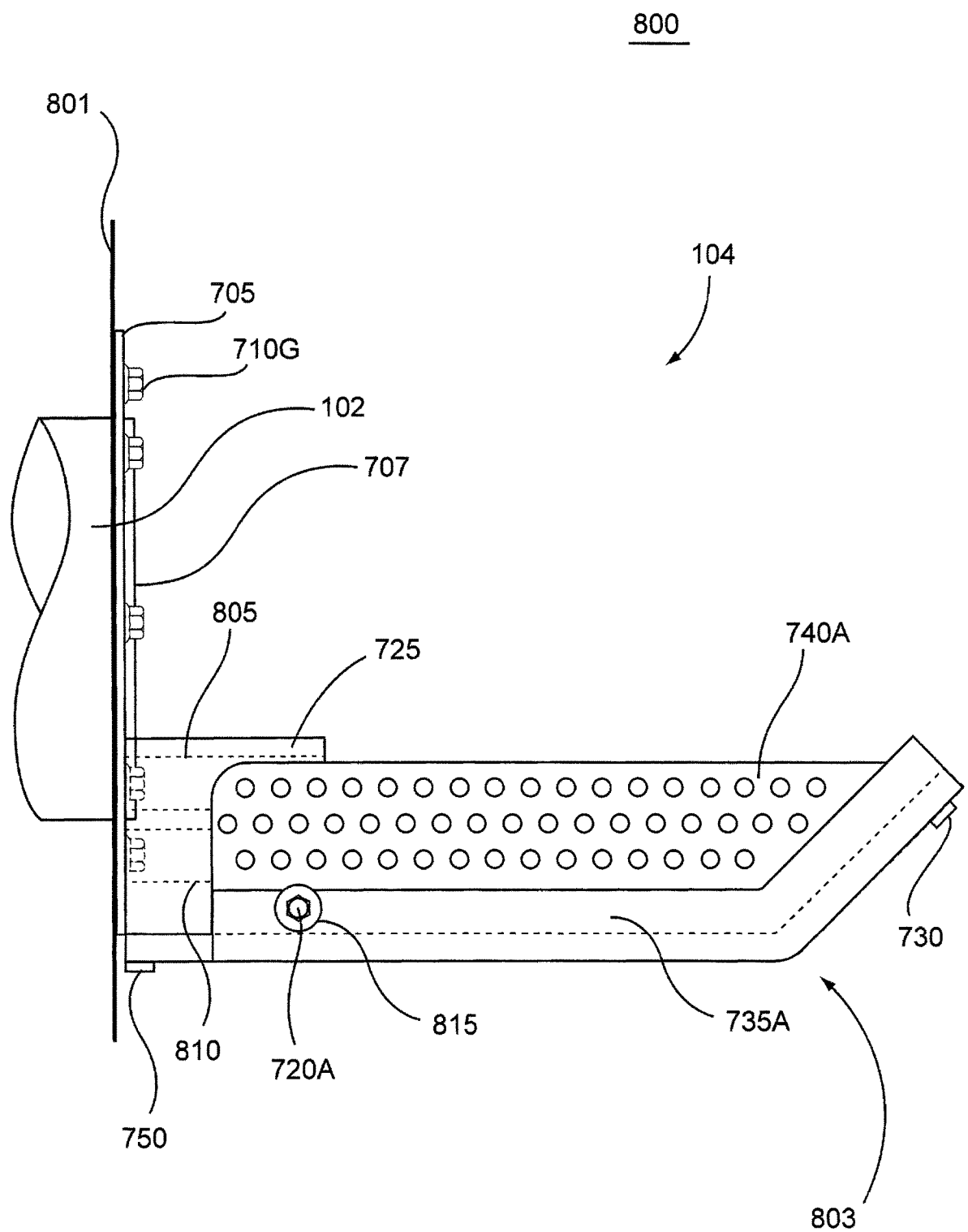
FIG. 8 shows a side view of a wall mounted retractable bar screen, according to at least one exemplary embodiment of the present invention.
Figure 9:
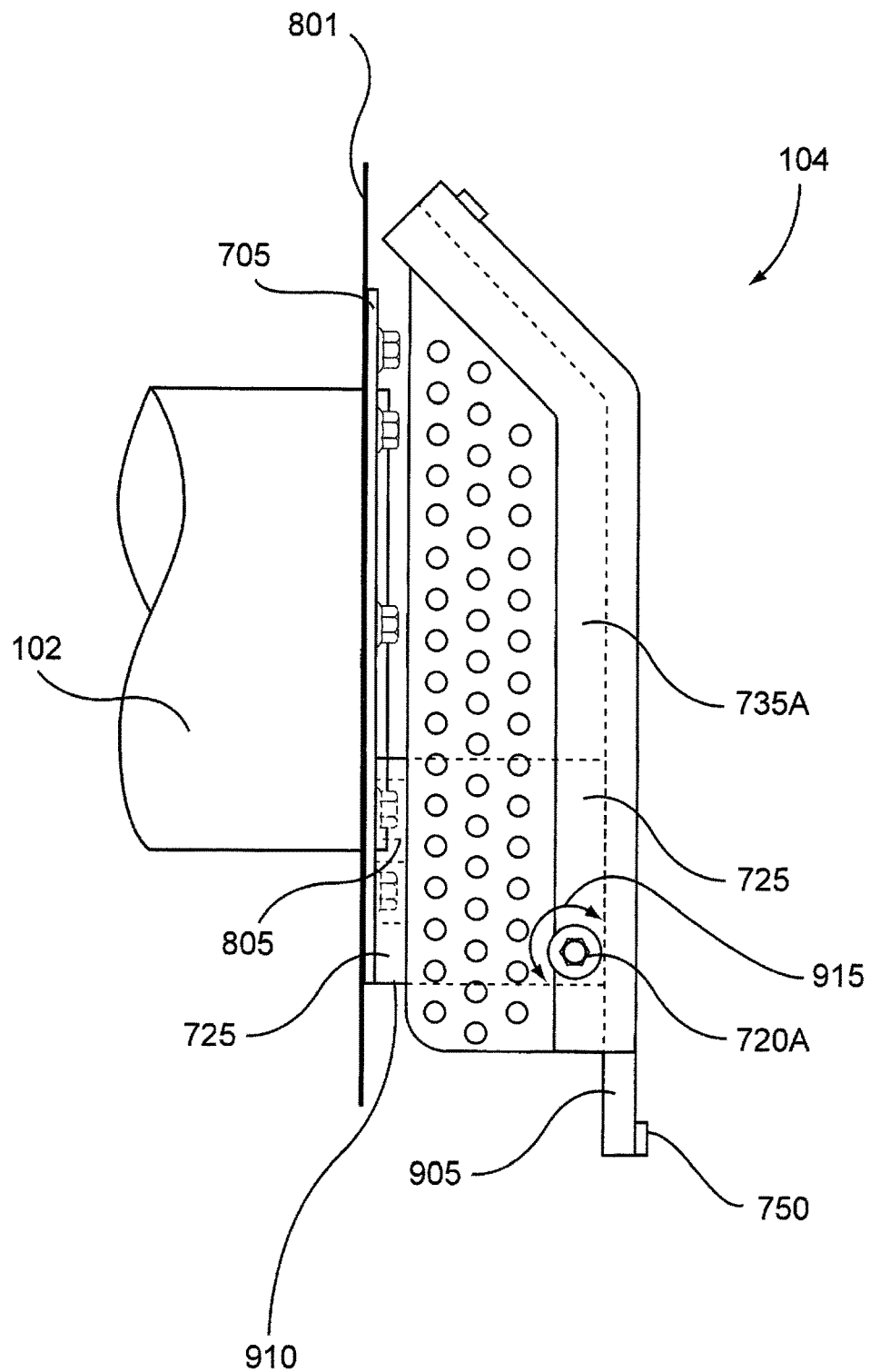
FIG. 9 shows a side view of a wall mounted retractable bar screen in the upright position, according to at least one exemplary embodiment of the present invention.

Referring now to FIGS. 7-9, another design and method to install the bar screen is provided, as provided by various other embodiments. This design and method provides for a wall mount system (as shown with bar screen 104 in FIG. 1) and may be particularly useful, for example, in situations in which the inlet pipe 102 does not extend sufficiently into the lift station tank or basin 110 so that a circular or band clamp attachment configuration will not work. The attachment means of the bar screen may be fitted with a mounting bracket that is integral to the bar screen and to a circular ring color or flange type 705. The mounting bracket may be thin in an upper portion 707 and thicker at a lower screen attachment area 725, and have a large enough circular opening 709 at its center so that the flange type mounting bracket 705 will fit around or over the inlet pipe 102 or around the mouth of the inlet pipe 102 without being compressed to or necessarily touching the outer diameter of the inlet pipe, and the flange type mounting bracket may mount flush to the wall. The mounting bracket 705 may have, for example, six holes (e.g., 805) in the shape of, for example, a hexagon and use appropriate anchoring bolts 710A—710H that may bolt directly into the lift station tank or basin 110 wall. This will provide a solid connection to secure the bar screen 104. Of course, other methods of easily mounting the bar screen 104 on at least one of its sides to the lift station tank or basin 110 are possible, but these two exemplary designs, systems and methods are particularly quick and cost effective to make and install.

Referring now particularly to FIG. 7, a front view of an RBS 104 mounted with a ring collar 705 and a plurality of bolts, e.g., bolts 710A—710 H. This collar goes around the pipe opening 101 and is affixed directly to the wall of the lift station 100. This collar 705 can be attached to the lift station 100 wall by bolting it with self tapping screws or lag bolts (e.g., bolts 710A—710H) cement nailed, or welded to the lift station 100 wall, depending on the make up of the lift station wall. The RBS works in generally the same manner, being normally in a horizontal position and retracted in a 90 degree rotation about the hinge pin or rod 715. Further, the hinge or pivot point rod 715 may have one or more threaded end(s), with nuts on the threaded end(s) to keep the screen portion from coming loose. Likewise, the screen portion of the RBS 104 may have a frame that includes left and right side rail bars 735A and 735B, and front cross beam bar 730 (mounted on the inside or outside) and back bottom cross beam bar 750. This frame may be connected to elongate lateral bottom and/or front bars 745A—745F, and support perforated or meshed type side walls 740A and 740B that may be approximately ½ the height of the diameter of the inlet pipe 102.

The primary reason for the different design of the mounting ring is due to the short pipe entry and extension from the tank or basin 110 inner wall surface. However, other various differences from the circle or band clamp RBS 103 design and method are notable. For example, the RBS 104 ring collar design includes a much larger mount 725 for hinging the screen portion of the RBS 104 to. It may be approximately 2-3 times wider and thicker than the mount 230 (see FIG. 2). Further, the pivotally mounted screen portion may have a shorter proximate end close to the pivot point that is used as a stop to keep the screen portion from going below an approximately parallel horizontal position for normal operation. This is designed shorter so that the mount 725 does not need to be overly large to make up for the shorter input pipe 102 length inside the wall of the tank or basin 110. This particular embodiment does not show the use of tensioning springs because they may not be needed. As one skilled in the art would appreciate, the use of a properly designed width and height of the large mount 725 in conjunction with the proper placement therein of the pivoting pin or rod 715, may exactly align the screen portion so that the lateral bars 745A—745F hit the front edge of the mount 725' sufficiently before the screen portion can obtain a 90 degree perpendicular position to the horizontal plane of the water surface and tank floor of the lift station 100, thereby resulting in the weight of the screen portion with gravitation pull to return the screen portion to the horizontal orientation automatically. (See, for example, FIGS. 8 and 9) This would save on weight, cost, and assembly time for assembling during manufacturing of the RBS 104 and during installation at the lift station 100. However, tensioning springs may be used if it is decided to be a needed safety feature or the friction about the hinge pin 715 is anticipated to more than offset the force of gravity with the weight of the screen portion in the almost perpendicular position.

Referring now to FIG. 8, this front view 800 illustration shows the large width of the mount 725 more clearly, and the small or short extension of one or more of the elongated lateral or horizontal bars 745A—745F. One can also see two of the three long holes 805 and 810 (a total of three in FIG. 7) in the mount 725, which are necessary to insert and secure the various lower bolts or screws, 710C, 710D and 710E. The RBS 104 is mounted directly to the wall with pipe 102 penetrating the interior of the lift station 100 by only a small distance. However, one skilled in the art would appreciate that this configuration is also very useful when the inlet pipe 102 does not penetrate the wall of the lift station 100 at all, or when the inlet pipe 101 may have sufficient length but may be suffering from age, material, or stress fatigue. As such, this embodiment makes installation of the RBS 104 easy in any lift station 100 wall or inlet pipe condition. As one skilled in the art would appreciate, the ring portion 705 and the mount 725 may be a single integral piece that may be molded, or two separate pieces that are bonded or welded, or screw/bolt fastened together. The same manufacturing methods, materials and like part dimensions may be used in this embodiment as those described above for other embodiments. This design results in the hinge being connected to the mount 725 and the ring collar 707 making a ring collar mount assembly 705. This allows for the ring collar 707 and mount 725 to be mounted to the tank or basin wall, and then the screen portion of the bar screen 104 to be connected to the mount 725 with a pin 715, that may be for example a long bolt with a washer 815 and nut 720A. In any case, this mounting still allows for pumps to be removed from below, underneath the RBS 104. Either gravity or tensioned springs may be used to restore the RBS 104 into its optimum operating position once the pump 105 or a maintenance person moves past it.

Referring now to FIG. 9, a side view 900 of one embodiment having a circular ring collar 705 mount configuration with the RBS 104 screen portion in the retracted position is provided. In this figure it is easier to see the back length 905 of one or more of the elongated bottom bar(s) 745A—745F that operates as the stop when the screen portion is in the normal operation position, that extends beyond the length of the side frame rail 735A. It is also more clear the pivot angle 915 about the pivot point centered about nut 720A being less than 90 degrees because one or more of the elongated bottom bar(s) 745A—745F will ultimately abut the front surface of the mount 725 before 90 degree retraction angle is reached. As such, in this embodiment, the tension spring is generally not needed unless one wishes to ensure the screen portion of RBS 104 will occur regardless of any friction at the hinge pin area. The bottom surface 910 of the ring collar plate 705 and the mount 725 are used as the stop with the back end of the horizontal bars 745A—745F, to keep the screen portion from rotating lower than an approximately horizontal or parallel position relative to the inlet pipe 102 lateral length, the water level, or the bottom of the tank or basin 110.

Figure 10:
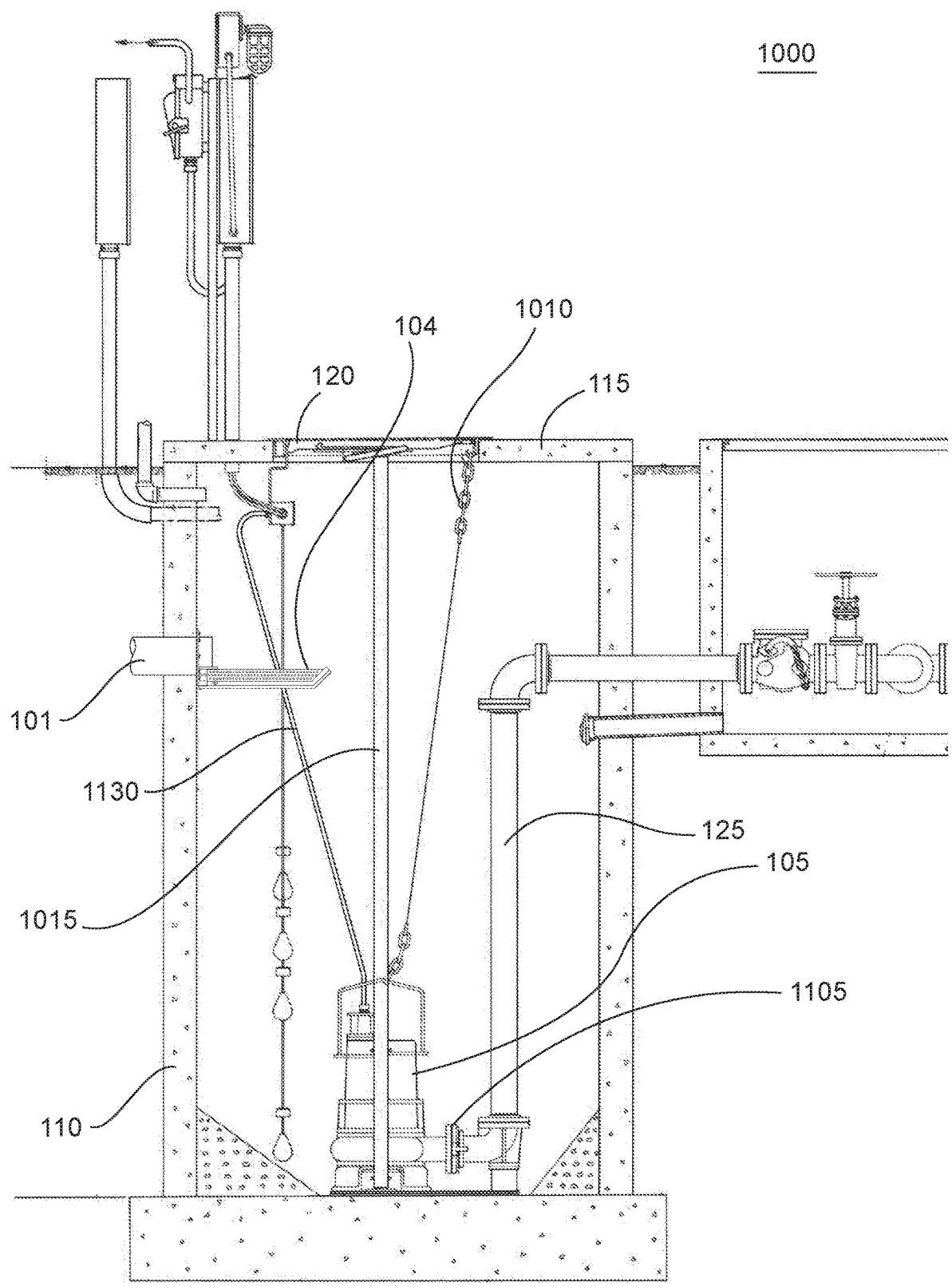
FIG. 10 shows a typical lift station installed with pump guide rails with a wall mounted retractable bar screen, according to at least one exemplary embodiment of the present invention.

Referring to FIG. 10, this side view depicts a typical lift station 1000 with a single pump 105 on a slide rail system

1015. A pump lift cable 1010 is coupled to a hatched door 120 and pump 105, and is configured and operable to be easily reached by a lift station maintenance person when the hatch door 120 is opened. An electric power cable is also coupled to the single pump 105 motor. The single pump 105 is connected to a slide coupling 1105 which automatically disconnects when the pump 105 is pulled up and automatically reconnects when the pump is lowered up and down the slide rail 1015 by pulling and letting down the pull cable 1010, respectively. An outlet pipe 125 is coupled to the pump 105 via the slide coupling 1105. A short mouthed inlet pipe 101 is shown with a ring collar bolt mounted RBS 104 provided, and will move up, out of the way of the pump 104 when maintenance necessitates removal.

Figure 12:
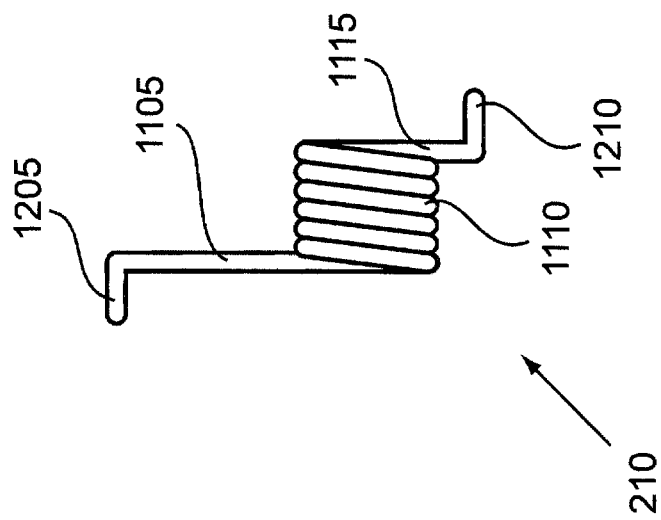
FIG. 12 shows a top view of one design of a spring that may be used with the retractable bar screen, according to at least one exemplary embodiment of the present invention.
Figure 11:
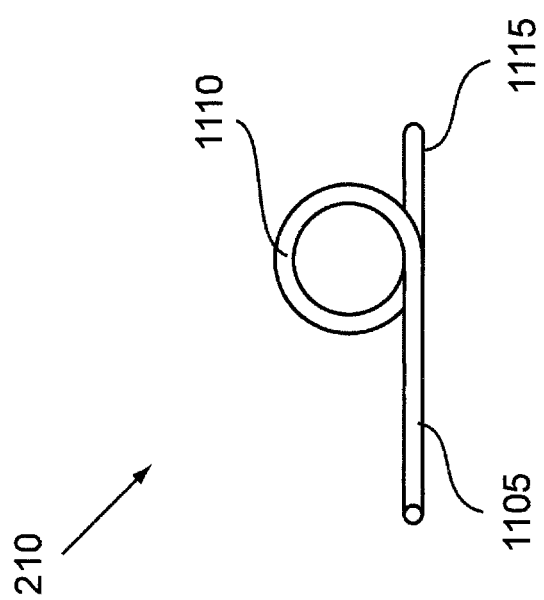
FIG. 11 shows a side view of one design of a spring that may be used with the retractable bar screen, according to at least one exemplary embodiment of the present invention.

Referring now to FIGS. 11 & 12, these illustrations depict a tension spring(s) 210 which may be used in the RBS 103 or 104. These tension springs may be of a relatively simple design and may be made of any number of shape retaining flexible shapes and/or materials, for example, a simple double opposing outward facing L arms 1105 and 1115 joined by a coil 1110, and made of a stainless steel. One of the arms 1105 may be longer than the other arm 1115. And each arm may have a foot or tab 1205 and 1210 that is bent to be outward from the coil 1110 and in opposite directions from one another (similar to a clothes pin spring, but having the feet or tab facing outward away from one another rather than toward one another). Also, as can be seen in FIG. 11, in this embodiment the arms may be placed in the same plane (although this is not a requirement). Using this design, one of the foot or tab 1115 may be placed into a hole on the outward side surface of the mount 230 or 725, and the other may be contacting the lower surface of one of the left and right side rail bars 410A, 735A and 735B, 410B. In this way, the spring(s) 210 may provide a nominal downward tension when the screen portion 403 or 803 is in its normal operational horizontal or lateral position, and a sufficient tension when the screen portion 403 or 803 is rotated upward toward the top of the lift station (or to the side in a side retraction system) so as to ensure the screen portion 403 or 803 automatically returns to the normal operation horizontal or lateral position immediately below the inlet pipe mouth for debris capture and removal.

Although not shown herein, a manual actuated rake having fingers and/or claws with similar construction to the bar screen, but open on one end, may be used to remove various items of debris that are captured by the retractable bar screens disclosed herein. The rake may include a secondary claw, trap, or holding mechanism to grasp or trap the debris from the bar screen without dropping it. This type of rake, in conjunction with the RBS, makes for a relatively inexpensive debris capture and removal system that a lift station 100 maintenance person(s) may use to remove undesirable debris from the lift station 100 and increase the life of the motor(s). In fact, this system may makes it possible to construct and/or operate small lift stations with only a single pump (no pump redundancy) without the fear of fatal or catastrophic sewage backups.

In still another embodiment as shown in FIGS. 13-17, the bar screen may include, for example, an eye hook lift bar and quick connect/disconnect configuration so that the debris retention screen may be easily connected and disconnected from the mounting and bracket mechanism. This embodiment shows another style bar screen that can be easily removed from the mounting configuration of the screen section from a lift station for easier cleaning. This configuration may be used with, for example, a simple pole with a hooked end or a pull cable (similar to those used for the pumps in the lift station). In this way, this embodiment allows the bar screen to become an integral part of lifting the unwanted debris out of the lift station. The mounting version of this bar screen may be similar to both of the embodiments in FIGS. 3-6 and 7-10. One of the primary differences may be the mounting of the bar screen to the mount and/or tang. In various embodiment of the removable bar screen (REMBS), the bar screen may include a means or mechanism for quickly and/or easily connecting and disconnecting to the mount and/or tang. In various embodiments, the mount and tang arrangement in FIG. 3 may be modified with, for example, a stainless steel bar or other higher strength material bar (e.g., fiber filled high density plastic) that may include stops on either side that serves as the connecting place for U-hooks associated with the re-configured bar screen seen in FIGS. 13-15.

Figure 13:
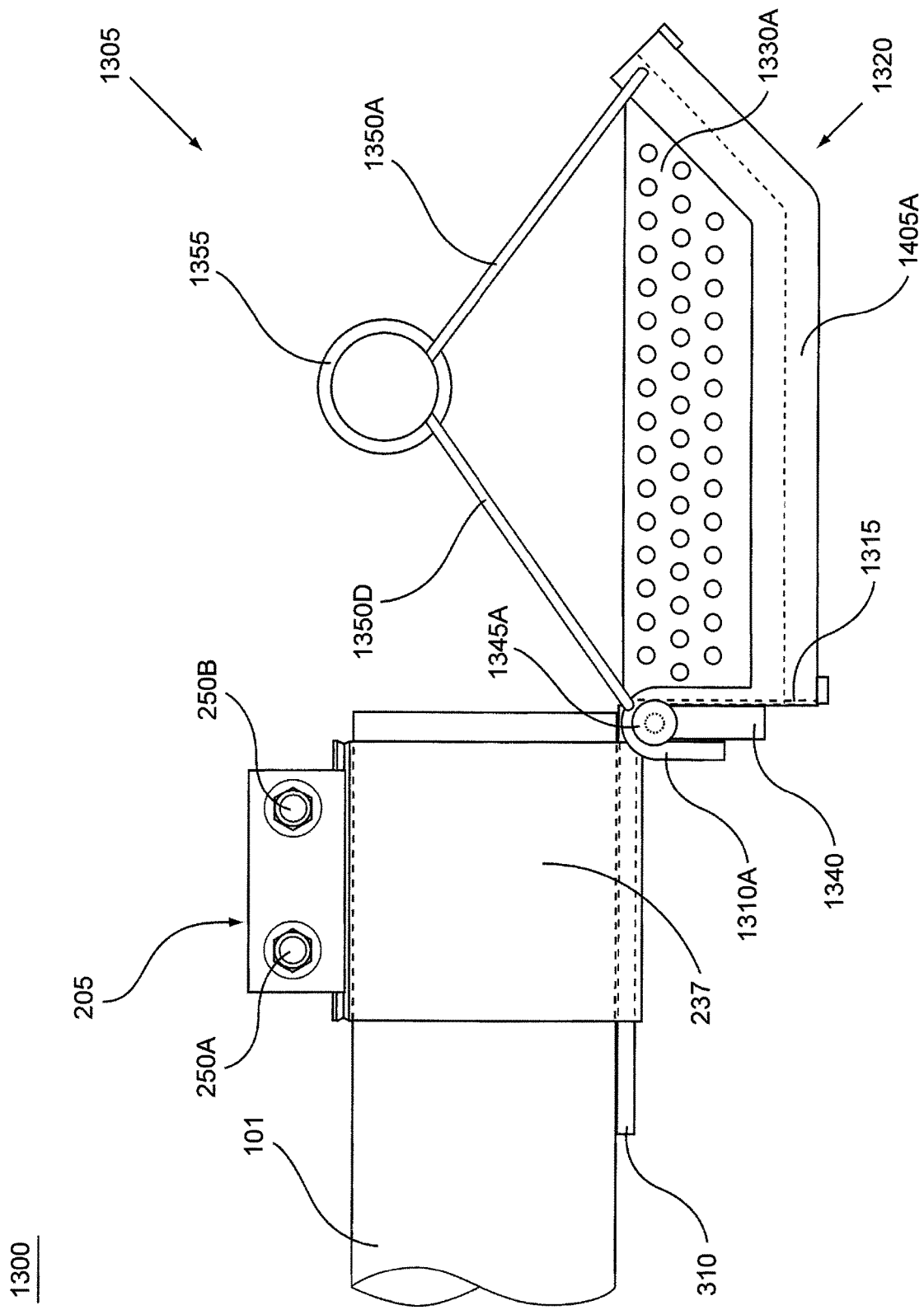
FIG. 13 shows a side view of a removable bar screen connected to a circular or band clamp type mount, according to at least one exemplary embodiment of the present invention.

Referring now to FIG. 13, this shows a side view 1300 of an embodiment including a removable bar screen (REMBS) 1305 connected mounted to a circular or band clamp type mount 205 with tang 310 having a portion 1340 angled approximately 90 degrees downward from the horizontal axis of the tang 310 with a bar 1345 (not shown) with end 1345A (opposite end 1345B not shown) attached to it. Bolts or screws 250A and 250B may be used to tighten the clamp band 237 around the inlet pipe 101 and the tang 310 so as to be securely fastened together and to hold the tang 310 in place on the inlet pipe 101. The bar 1345 may have a stop 1345A and stop 1345B (not shown in FIG. 13) attached to either end which may keep the removable bar screen (REMBS) 1305 from slipping of either side of the mount. It is noteworthy that the REMBS 1305 may be located further below the inlet pipe 101 outlet than the RBS style bar screen and may have a back wall 1315, so as to allow for having a floor and four side wall construction so that any debris caught therein does not fall out when the REMBS 1305 is removed and pulled out of the lift station well, tank or basin 110. For example, the back wall of the REMBS 1305 may be any height sufficient to help keep debris in the REMBS 1305 during removal, but in various embodiments the height may be approximately the same height as the sides 1330A and 1330B, and may or may not have perforated holes or slits therein. The front wall 1320 of the REMBS 1320 may be sloped. And the outermost surface may be the rod or bar 1325. The REMBS 1305 may include an eye hook 1355 for connecting to with a hook to pull the REMBS 1305 up when the lift station 100 or motors and pumps 105 need cleaned or services, or when it is time to remove debris caught by the REMBS 1305. The eye hook 1355 may be connected to the REMBS 1305 via, for example, four bars or rods 1350A, 1350B, 1350C, and 1350D (only 1350A and 1350D are shown in FIG. 13) that may be connected in some manner such as welding, bonding, bolts, etc. In this way a rod with a hook on the end (not shown herein) maybe place in the eye hook 1355 and used to move the REMBS 1305 onto or off of the mount upon which it is set via the side hooks 1310A and 1310B.

Figure 14:
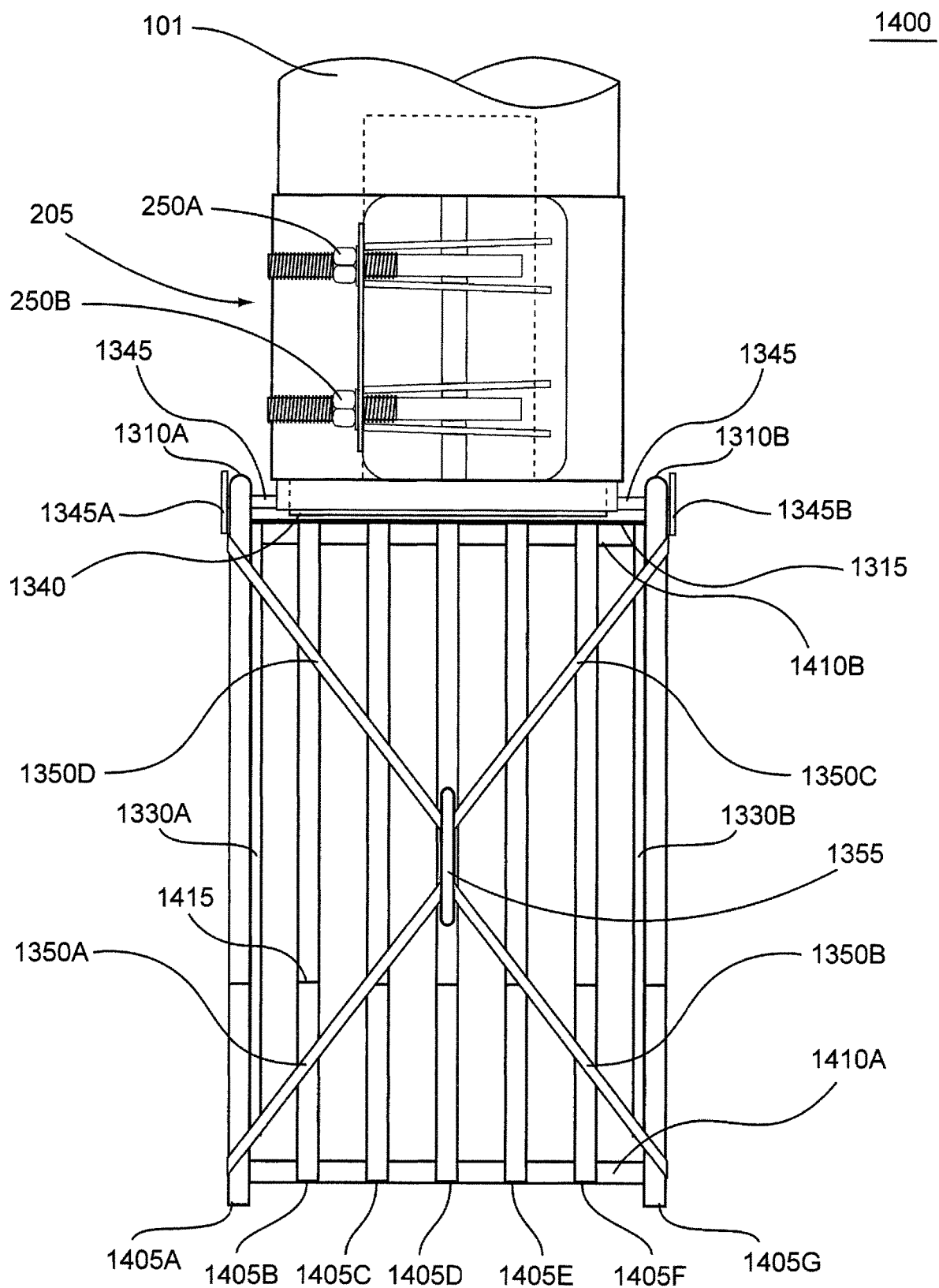
FIG. 14 shows a top view of a removable bar screen, according to at least one exemplary embodiment of the present invention.

Referring now to FIG. 14 shows a top view 1400 of a removable bar screen, according to at least one exemplary embodiment of the present invention. The eye hook 1355 attachment bars or rods 1350A, 1350B, 1350C, and 1350D are shown here, attaching the eye hook 1355 to the bar screen frame bars 1410A, 1405F, 1405G, and 1410B (may also be part of the back wall 1315 and side hooks 1310A and 1310B). The lateral bars of the bar screen may include bars 1405B, 1405C, 1405D, 1405E and 1405F, although more or less bars may be used as indicated above with respect to the other embodiments. This embodiment bar screen may have similar dimensions and be made of similar materials, as the previously described embodiments. The eye hook 1355 attachment bars or rods 1350A, 1350B, 1350C, and 1350D may also be made of the same or similar materials as those used for the bar screen frame and/or lateral bars, and all may be made integrally using, for example, a molding process.

Figure 15:
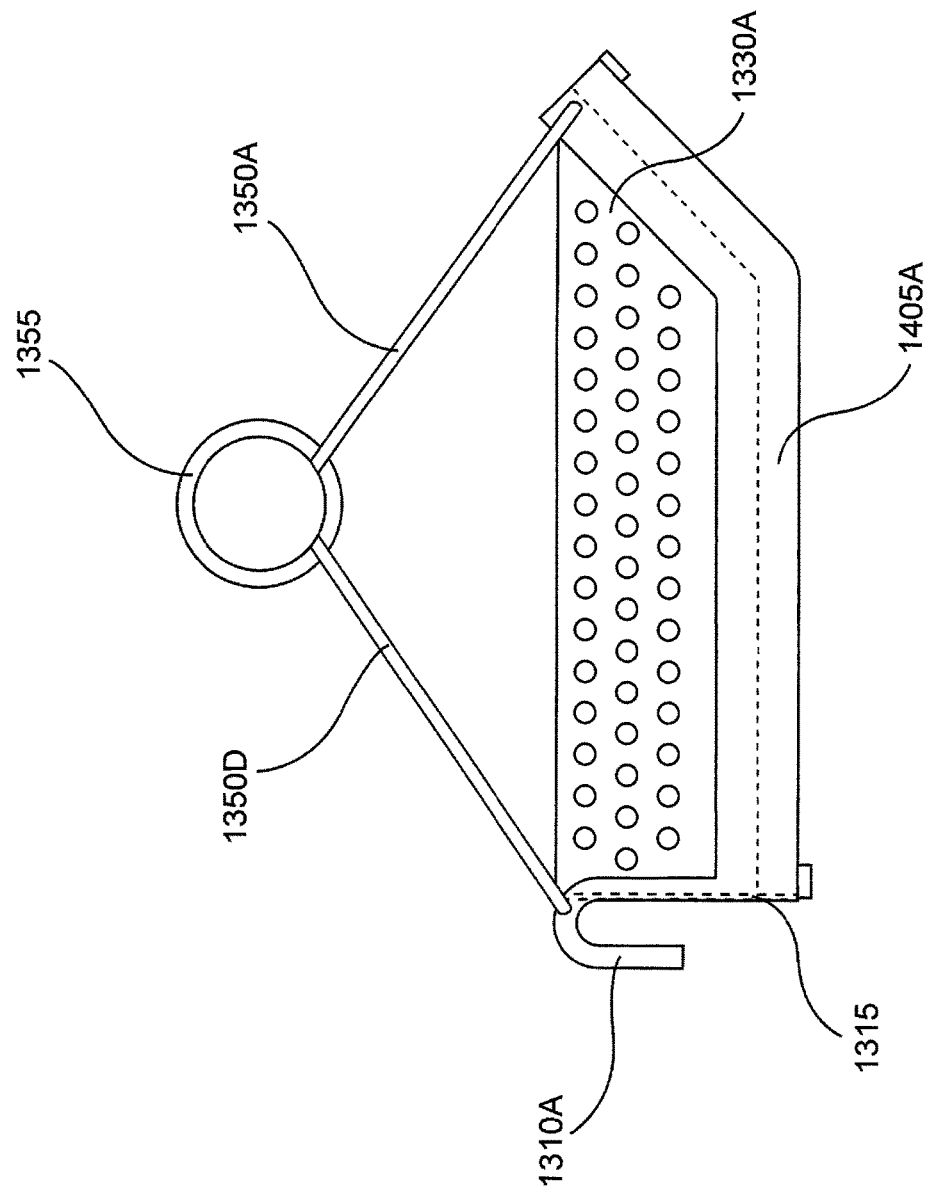
FIG. 15 shows a side view of a removable bar screen with a quick connect/disconnect arrangement attachment hooks for removably connecting the bar screen to a mount that includes a rod attachment, according to at least one exemplary embodiment of the present invention.

Referring now to FIG. 15, this shows a side view 1500 of a removable bar screen 1305 with its side hook 1310A and back wall 1315 more clearly shown. As can be seen from this drawing the side hook 1310A has a slightly more than half circle shape, so that it will catch and hold the bar 1345 (not shown) that is part of the mount, and not slip off under the weight of the bar screen 1305 with or without the added weight and movement of incoming waste water or storm water and any debris caught by the bar screen 1305. Also, it is more clearly shown that the back wall 1315 may be preferably flat and may be attached to or integrally formed with the side frame bar 1405A. The back wall may also have an elongated portion that extends down below the bottom of the side frame bar 1305 to act as a stop with an extended portion of the tang (not shown in this figure), as will be discussed in more detail below with respect to FIGS. 16 and 17.

Figure 16:
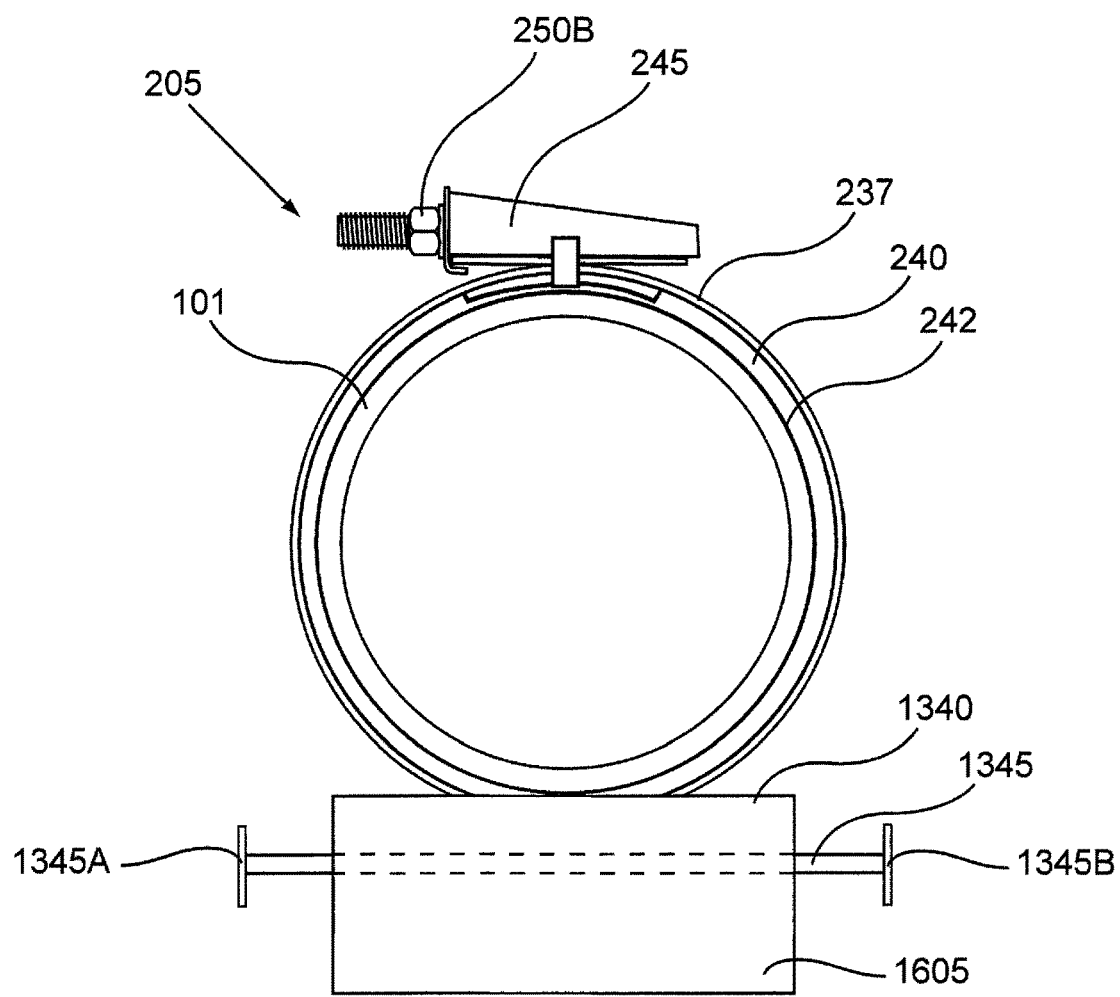
FIG. 16 shows a front view of a circular or band clamp type mount with the removable bar screen removed, according to at least one exemplary embodiment of the present invention.

Referring now to FIG. 16, this illustration shows a front view 1600 of a circular or band clamp type mount 205 with a band 237 around an inlet pipe 101 and tang 310 (not shown) with the removable bar screen 1305 removed, according to at least one exemplary embodiment of the present invention. In this way, one can better appreciate the design of the tang with a bent down portion of the tang 1340 and an extended portion 1605 thereof that extends below the mounting bar 1345 and its lateral extension with end stops 1345A and 1345B. The lower portion 1605 of the angled tang is extended downward below the mounting bar 1345 so as to act in conjunction with the back wall 1315 of the REMBS 1305 (not shown in this FIG.) as a stopping point for the REMBS 1305 to keep it from falling downward when hooked onto the bar 1345. Stops 1345A and 1345B may be added in some embodiments to keep the REMBS 1305 from sliding right or left off of the bar 1345. The bar 1345 may be attached to the downward bent portion of the tang using various types of connection mechanisms including epoxy, welding, integral forming, half moon brackets with rivets or screws, etc. It is also noteworthy that although this embodiment is designed so that it is removable, one skilled in the art would appreciate that it may also be retractable to some point, and may be designed in such a way so as to be both retractable and removable, by for example, using flexibly eye hook connectors 1350A-1350D.

Figure 17:
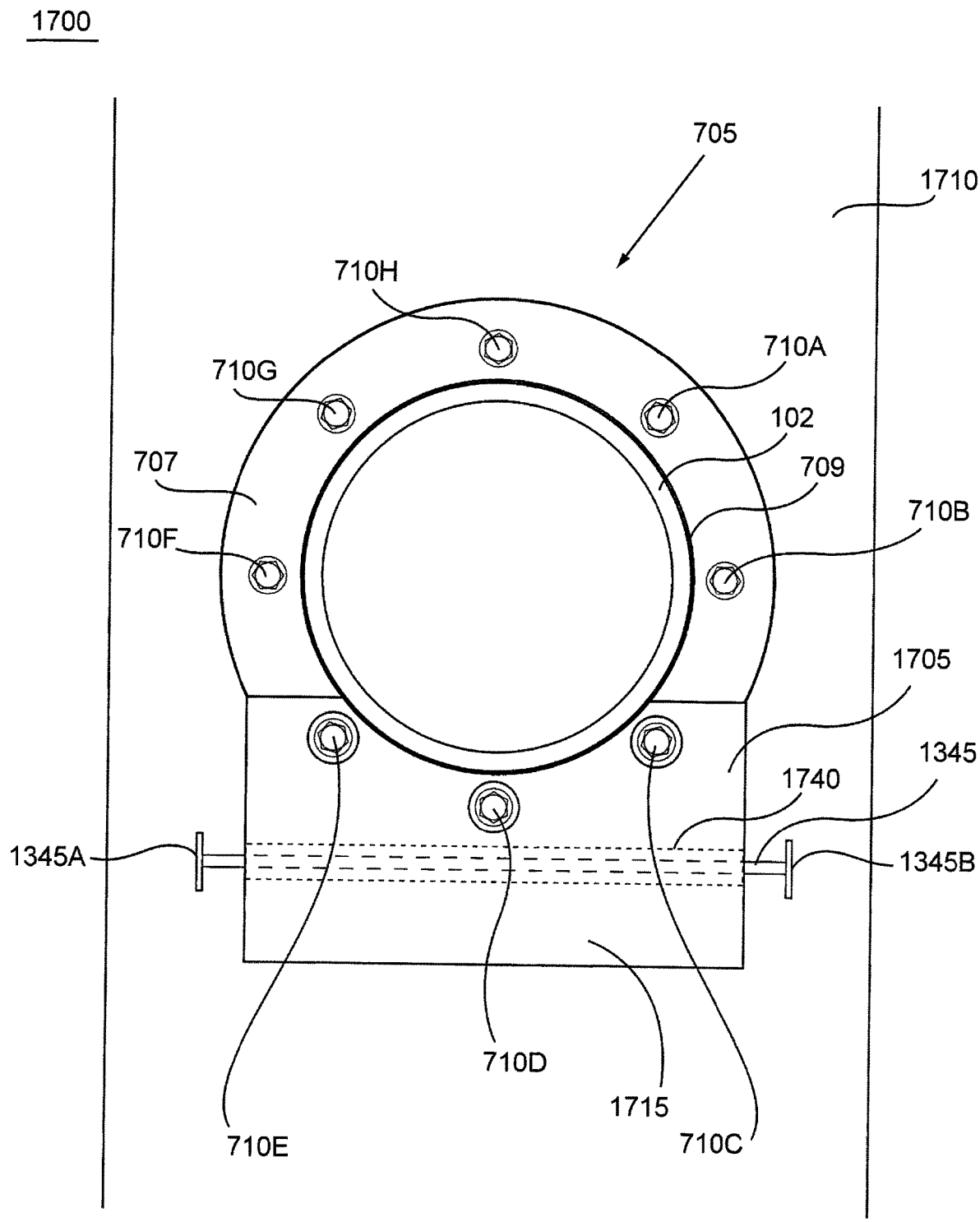
FIG. 17 shows a front view of a ring type wall mount with the removable bar screen removed, according to at least one exemplary embodiment of the present invention.

FIG. 17 shows a different front view 1700 for a ring type wall mount with the removable bar screen 1305 removed, according to at least one exemplary embodiment of the present invention. In this case, the mounting block 1705 may be attached to the collar or ring 705 and have a couple of bolts 710C and 710D there through it. A rod or studs 1345 having a plurality of stops 1345A and 1345B at their ends may be provided and be place through a hole 1740 that is formed or bored in the mounting block 1705. The lower portion 1715 of the mounting block 1705 may act as a rotational stop for the REMBS 1305 and may abut the back wall 1315 (or an extension thereof of the bar screen 1305. As such, the bar screen attachment hooks 1310A and 1310B, once engaged to the bar 1345 on either side of the inlet (or outfall) pipe 102 (or 101), seen in FIGS. 16 and 17, fasten the bar screen 1305 to the pipe mount 205, 705. This allows for easy removal and placement of the bar screen for maintenance and/or cleaning.

Figure 18A:
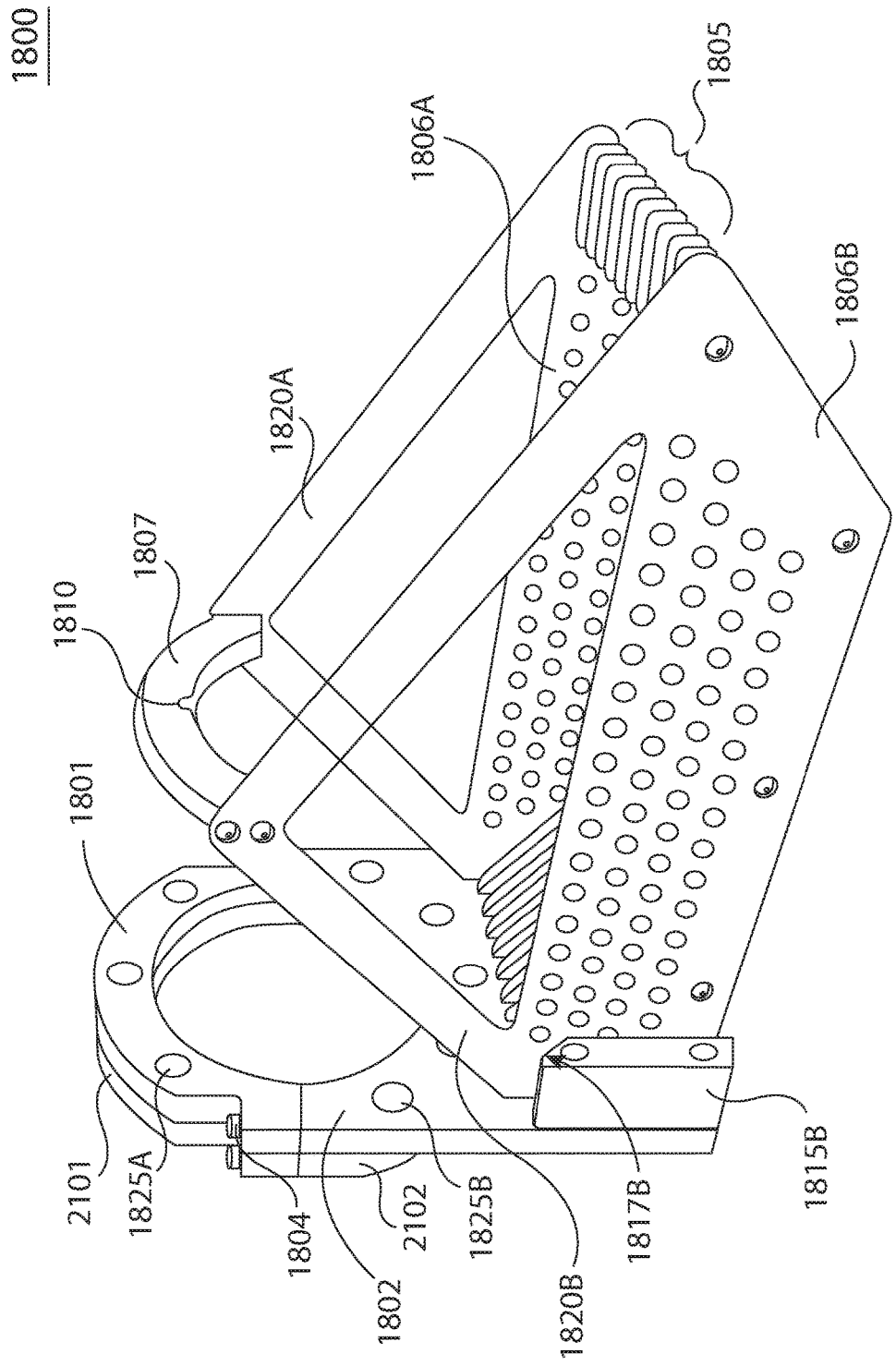
FIG. 18A shows a perspective view of the combination wall and/or pipe collar mount with an adjustable width removable bar screen attached, according to one exemplary embodiment of the present invention.
Figure 18B:
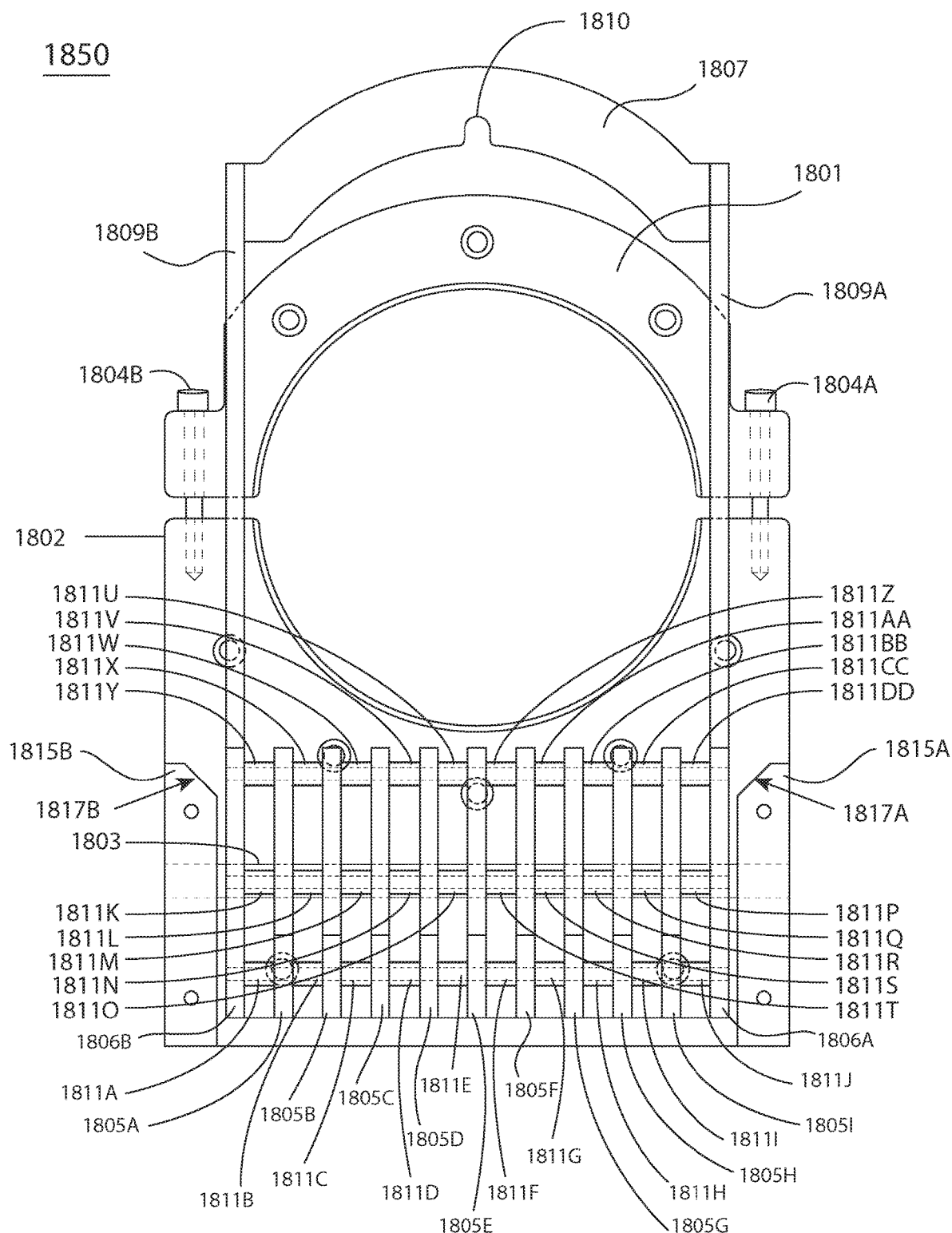
FIG. 18B shows a front view of the combination collar mount for either wall and/or pipe with the removable bar screen attached thereto, according to one exemplary embodiment of the present invention.

FIGS. 18A and 18B shows another different embodiment of a bar screen with a different style wall mount mechanism with integral clamp and an adjustable width removable bar screen with integral removal handle arms. FIG. 18A shows a perspective view of this embodiment of a debris catching device with mount 1800 that includes a different style of wall mount mechanism(s) and a different style bar screen. For example, the bar screen may include a first mounting collar having two separate portions or pieces 1801 and 1802 that work in tandem to, for example, clamp around the outside diameter surface of an inlet pipe 102 in, for example, a lift station. The clamp portions or pieces 1801 and 1802 may be fastened together and closed around the outside diameter surface of the inlet pipe by, for example, screws 1804. The mounting arrangement may include a second (auxiliary) mounting collar abutting to the first mounting collar that also have two portions or parts 2101 and 2102 that work in tandem to, for example, clamp around the outside diameter surface of an inlet pipe 102 in, for example, a lift station. The use of the second mounting collar is optional and intended to provide a more secure attachment to the outside diameter of an inlet pipe when the pipe has sufficient length, is too smooth, and/or is in poor condition. The mounting collar(s) may also include one or more holes 1825A, 1825B, etc., for accommodating a mounting bolt(s) instead of, or in addition to, the use of the clamping around the outside diameter surface of the inlet pipe. Further, the mounting collar bracket may include a plurality of ears or blocks 1815A and 1815B (only 1815B shows in FIG. 18A) for attaching a receiver bar 1803 (not shown in FIG. 18A) to the lower pieces 1802 of the mounting collar for mounting a removable bar screen thereto. The ears or blocks 1815A and 1815 B may each include a tapered edge 1817A and 1817B, respectively, to as to make alignment of the bar screen to the receiver bar 1803 and the lower piece 1802 of the mounting collar bracket more easy.

The removable bar screen shown in the embodiment in FIG. 18A may include two sides 1806A and 1806B that have integral handle attachment members or bars 1820A and 1820B, respectively, to which a cross-member or handle type member 1807 may be connect. As such, manufacturing of the connection between the sides 1806A and 1806B and a handle or cross bar 1807 can be simplified compared to the embodiment shown in FIGS. 13-17 above. The handle or cross bar 1807 may include a slit 1810 for more easily locating a removing hook on the end of an extracting pole (discussed more below) for successfully removing the bar screen when it had inorganic debris in it. The cross member, handle, or cross bar 1807 may be positioned on the integral handle attachment members or bars 1820A and 1820B so as to allow a forward tilt to pre-position the removable bar screen for easier seating in mounting collar and the tilt places the bar screen into position to mount quickly when seating. The bar screen may also include a plurality of lateral parallel bars 1805 that make up the bottom or floor of the bars screen so that it may let various liquid and some relatively small solid or degrading waste material through while catching various inorganic debris, without damming up. A more detailed description of this embodiment and variation there from follow with reference to FIGS. 18B-21.

Referring now to FIG. 18B, a front view of a different style removable bar screen and mounting collar configuration 1850 is shown, with a parallel bar configuration and a mounting collar that may be segmented in multiple pieces such as two portions or halves 1801 and 1802. The mounting collar may separate to easily bolt or attach directly to the incoming pipe and/or wall. The mounting collar in FIG. 18 can be made from, for example, PVC (polyvinyl chloride), ABS (Acrylonitrile butadiene styrene), HDPE (High Density Poly Ethylene), Lexan (polycarbonate resin thermoplastic) or some other type material that has, for example, good strength, light weight, and does not corrode under the harsh condition of sewer water and gas, such as a high density plastic. It may also be made from stainless steel or another material used for manufacturing purposes for similar products or applications, although weight, cost, strength, durability, and manufacturability may be a detriment with this or other materials. The collar and bar screen pieces may be machined, milled on a CNC (Computer Numerical Controlled) 3 or 5 axis machine or using certain methods molded, blown or injection. These collars are designed to fit pipes 102 which come into the station. These pipes 102 may be made from various material, PVC, Plastic, Clay, or ferrous material. The top half of the collar 1801 and the lower half 1802 (that also comes the receptacle for the removable bar screen 1305) form this embodiment of the mounting collar. This type of mounting collar has incorporated another method of nesting or seating the bar screen that differs from previously shown in FIGS. 13-17 which depict a mounting bracket bar 1345 on the outside left and right sides of the mounting collar. The embodiment illustrated in FIG. 18 shows an interior mounting system. The bar screen sits in the receiver attaching to a receiver bar 1803 inside the ears or blocks 1815A and 1815B using a cantilevered position to secure the bar screen to the mounting collar. The ears or blocks 1815A and 1815B may be attached to mounting bracket or collar lower piece 1802, using for example, screws, bolts, adhesive, epoxy, etc., or may be integrally formed with the collar lower piece 1802. In any case, the collar still mounts on the pipe 102 but instead of using a full circle clamp it may be fastened to the pipe 102 with two bolts 1804A and 1804B tightened down to fully secure the REMBS to the pipe 102.

Jumping ahead for a moment, an embodiment including a second or ancillary mounting bracket configuration for the mounting collar is shown in FIG. 21. The ancillary mounting bracket, like the primary mounting collar, may have two separate pieces, an upper piece 2101 and a lower piece 2012. The ancillary can be used in some circumstances to add more surface area contact to the mounting collar. These pieces may be, for example, bolted into the existing collar 1801 & 1802, extending the mount by the width of the ancillary mounting bracket, by for example 1 inch. More ancillary mounting bracket segments and or extensions can be added to increase security and stability to pipe 102 if needed. Each extension may have bolts 2103A and 2103B to clamp the extension to the pipe 102. And all of the extensions may be held together and/or attached to the station wall by, for example, a plurality of bolts, for example bolts 1825A, 1825B, etc.

Referring now back to FIG. 18B, an interior view of the sides of the bar screen 1806A and 1806B and the interior bar pieces 1805A—18051 are shown. These bar pieces may be spaced apart using, for example, specifically sized and uniform spacers 1811 A-1811NN. These spacers are designed to spread the bars apart to allow for debris to be caught on the screen and water and biological debris to flow through. They are also designed to be disassembled and reassemble in different configuration to allow for more spacing distance between the bars, i.e. increase the spread from ½ inches to 1 inch. This configuration may be desirable to the operator to allow for more gross material to pass through but only catch debris larger than an inch in diameter. Interior bars are removed and spacers may be doubled to allow for more spacing between the bars. In some cases several bars may be removed to accommodate the varied spacing. Depending on the size of the bar screen, a 20" inch pipe may accommodate a 20" inch bar screen. This pipe being quite large in diameter may have the bars spread to 1½ inches to afford even greater sized debris to flow through it. (A side view of one of the bars is shown in FIG. 22 and described in more detail below.) In lift stations that accommodate such large pipe also have very large pumps than can handle much larger debris. This flexibility of bar spacing can accommodate many different pipe, pump and flow configurations for the operator. This idea is unique to this bar screen design allowing mass production of uniform spacers to lower manufacturing cost and at the same time increase the use of this bar screen in various applications due to its flexibility. As explained above with reference to the perspective view, the sides 1806A and 1806B may be designed to incorporate handle attachment bars 1809A and 1809B extending upward to attach a cross member 1807 that may be formed in the shape of a handle. In this embodiment view, the cross member 1807 is shown to be higher than the top of the mounting collar 1801, but may be either higher than or lower than the top portion 1801 of the mounting collar. The cross member 1807 may be formed in an arched shape and may have a grove 1810 formed at about the center of the arch so as to quickly align a lifting hook so as to more quickly and easily lift the bar screen off of the mounting collar. The cross member 1807 or handle in this embodiment may be made from the same material that the bar screen is constructed, but it also may be made from a variety of other materials such as steel, another plastic or even wood. Though these other materials may detract from the bar screens design by adding weight or not having a long service life. Notice that this handle may also include a groove or cradle area 1810 in about the middle to facilitate or ensure correct positioning of a bar screen to center and balance it when removal and installation hook or retrieval tool may be used to lift the bar screen and allow an operator to more easily clear debris from the bar screen. This is one position where a retrieval and reinstallation tool may be used to remove and reinstall the bar screen during use. Other possible systems and/or methods for the removal and reinstallation of the bar screen may include, for example, half a ring such as in 1355, a two point pick up, a three point pick, a four point pick up that may utilize a plurality of perforation drain holes on the side panels 1809A ad 1809B, or even a special connecting piece that mates with a special retrieval tool. This notch can vary in size to accommodate different sizes of hooking devices. Currently, this REMBS proposed in the present embodiment uses a system of a hook arrangement specifically purposed for retrieval of the bar screen as shown herein, e.g., a three quarter circle hook attached to the end of a pole.

As with the other embodiments, some particular materials that may be used to form this embodiment for the various parts or sides and bars of the screen portion, debris catching device, mount, and/or bar screen may include, e.g., high density plastic, such as PVC (polyvinyl chloride) or some other plastic product to reduce profile, increase versatility and weight. Other material may be used such as ABS, HDPE (High Density Polyethylene), or a polycarbonate resin (e.g., Lexan made by SABIC Innovative Plastics Inc.). These plastics offer different qualities that may enhance production methodology, such as press molding, blown molds or laser cutting. These plastics have qualities that may also reduce weight of bar screen while maintaining rigidity and strength.

Figure 19:
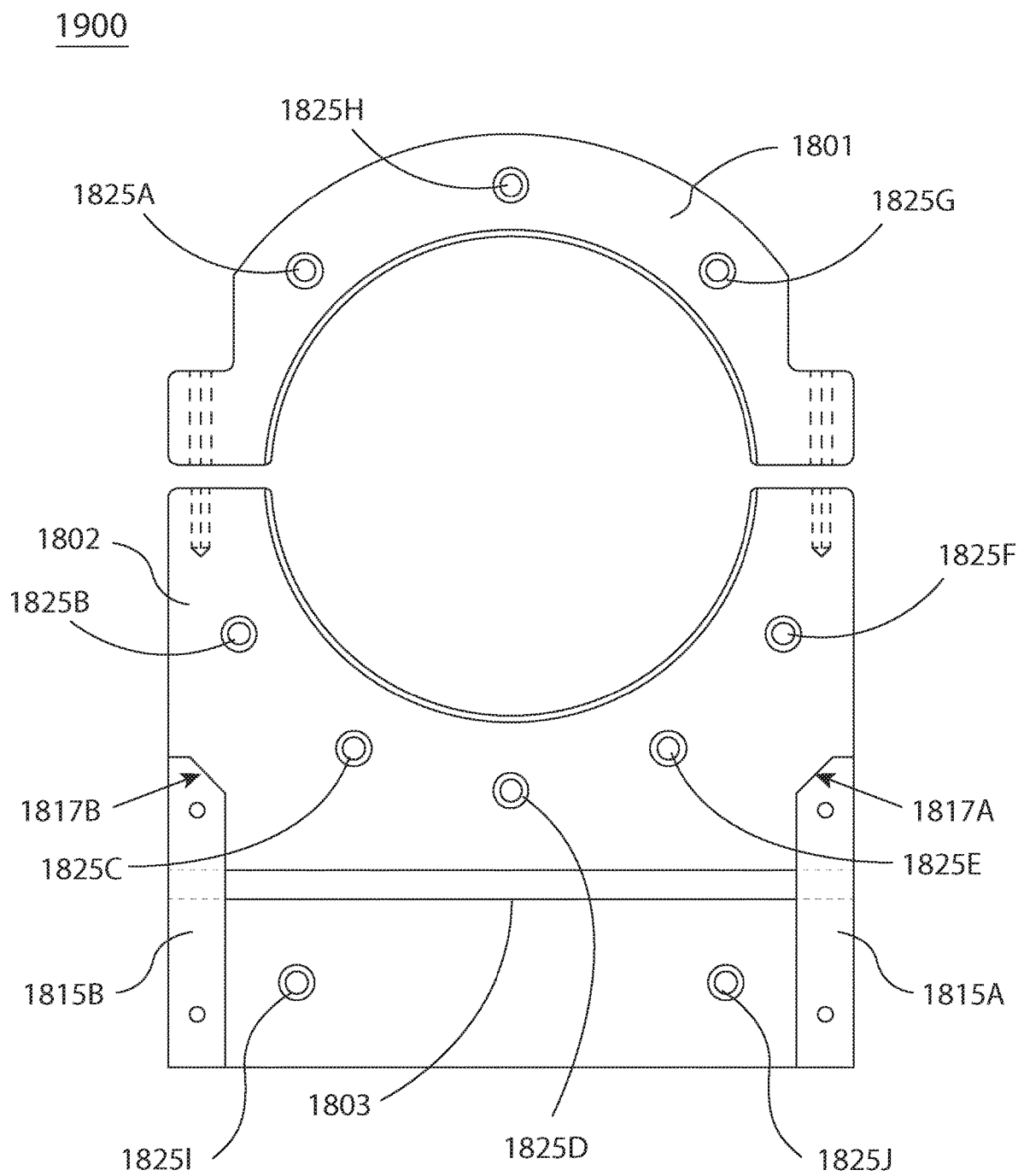
FIG. 19 shows a front view of the combination collar mount for wall and/or pipe mount with the removable bar screen not installed, according to one exemplary embodiment of the present invention.

FIG. 19 shows the mounting collar without the removable bar screen 1801 & 1802 attached. The bar screen receiver mounting bar 1803 runs laterally across the bottom mounting area of the mounting collar lower section 1802 and attaches to ears or blocks 1815A and 1815B. The bar screen receiver mounting bar 1803 may be a long bar, bolt or a threaded rod, and may be made from, for example, brass, stainless steel, or plastic. The receiver bar mounts into the ears or blocks 1815A and 1815B which together act as the bar screen receiver mounts. The ears or blocks 1815A and 1815B are designed to accommodate the bar screen in seating correctly on the mounting bar 1803. The inward slope shape 1817A and 1817B may help facilitate the bar screen properly seating. The mounting holes 1825A-1825J may be included in this mounting configuration (similar to 710 A-H) for mounting the collar to the wall with, for example, bolts or screws (with or without using the clamping feature).

Figure 20:
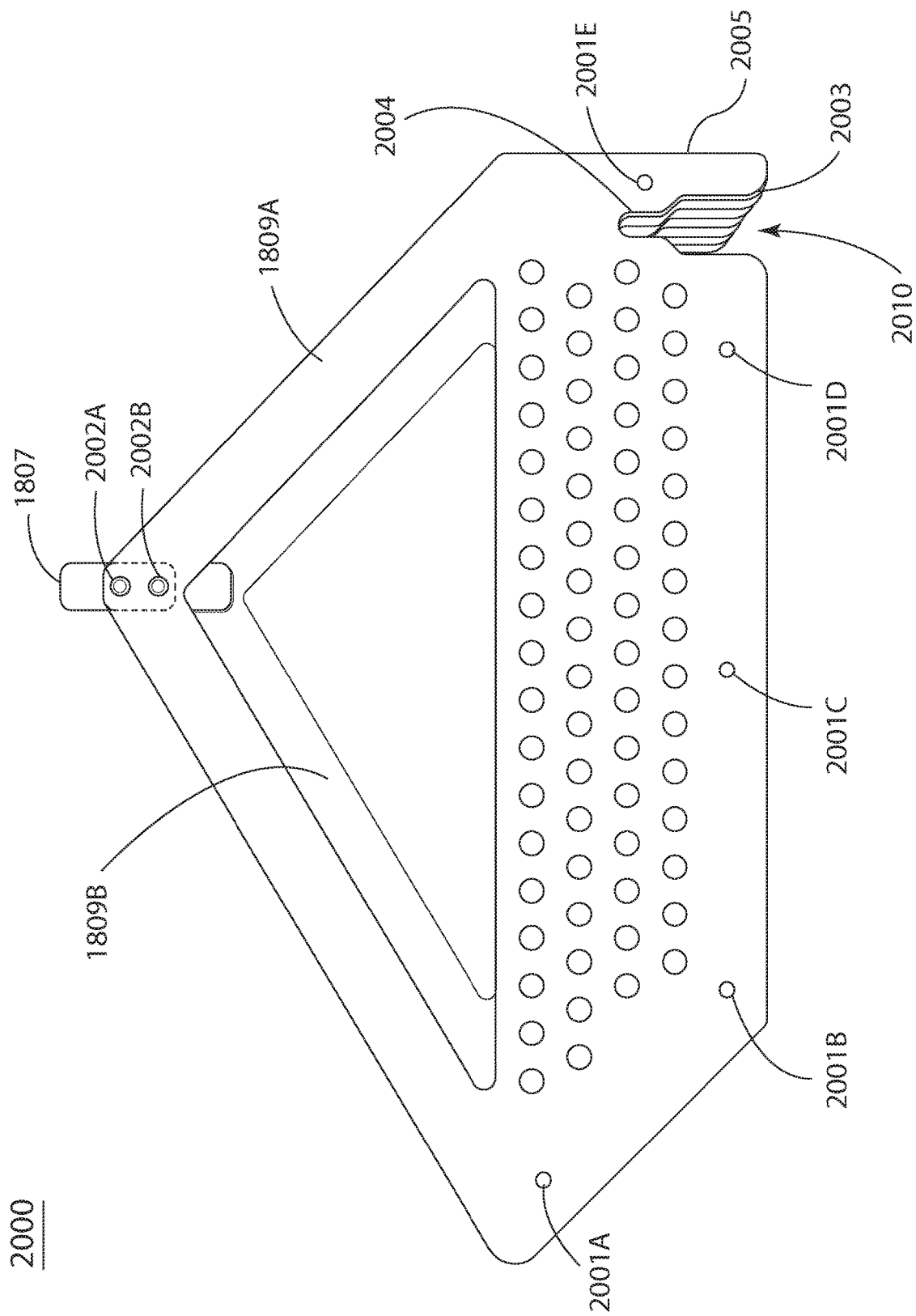
FIG. 20 shows a side view of the bar screen not attached to the combination collar mount for wall or pipe, according to one exemplary embodiment of the present invention.

FIG. 20 shows a side view of the bar screen removed from the mounting collar. A series of bolts or threaded bars 2001A-2001E may be used to hold the bar screen together and the handle to the sides 1809A and 1809B with bolts 2002A and 2002B. These bolts may be removed to enable interior bars 1805A-1805I (see FIG. 18B above) to customize the bar screen to, for example, increase gap distance allowing more flow debris to pass through or to expand the width of the bar screen to cover more area. The spacers 1811A-1811NN (or more) may be reinserted to retain continuity. The bar screen's receiver end 2010 is designed to accommodate an easy and rapid placement of the screen into the mounting collar receiver 1802. The bar screen is shown in this embodiment with a design having an lower channel 2003 that is wider and an upper channel 2004 that is narrower, that is specially designed and manufactured to connect to the receiver's bar 1803. This two size channel pattern may be included in each of the parallel bars 1805A-1805I and the sides 1806A and 1806B, so as to form a multi-point hooking mounting mechanism that interfaces closely with the mounting bar 1803. The back edge 2005 of each of the parallel bars 1805A—1805I and the sides 1806A and 1806B are made flat to abut up against the outward face of the lower section 1802 of the mounting collar, when the mounting bar 1803 is engaged in the upper channel 2003. This may make for a tight and secure fit of the removable bar screen to the mounting collar (which may be mounted to the inlet pipe or station wall). This interconnectivity lends to the strength of the bar screen when seated into the mounting collar. The cantilevered bar screen is then supported across the entire surface of the mounting bar instead of two points as previously shown in another embodiment. It also may facilitate the quick change out of bars to accommodate spacing changes. To facilitate this rapid exchange the operator uses a common hex wrench and removes the seven (7) retaining screws for one side of the REMBS (2002A & B and 2001A-E). After removing the retaining screws, gently slide the side (1806 A Or B) off and remove the spacers (1811A-NN) there are 50 on an eight (8) inch RMBS. Then slide the remaining interior bars (1805A-I) and spacers out for the interior retaining rods that hold the entire screen together laterally. The bars are not shown but run through the length of the bar screen right to left. The screws (2001A-E) are screwed into the threaded ends of each interior rod. These rods are made of the same light weight plastic that the REMBS is made from. Once all bars are removed except the very last bar the spacers are then replaced in twos or doubles to create the one (1) inch gap. Each time you double the spacers, you then place an interior bar back down the retaining rods. The operator continues this until he has placed the REMBS in the same overall width of the handle. The operator will be left with three (3) extra interior bars and have a gap distance of one (1) inch across the bars of the REMBS. The configuration will vary from size to size and the operator will have the option of make one side or the middle of the REMBS half inch or one inch. This offers unique flexibility in a single screen. In larger sizes the gap distance can be enlarged to one and one half inch (1.5") or even two inches (2") by tripling or quadrupling the spacers. The uniformity of the spacers makes this possible. Extra spacers may be required for these larger gap requirements.

As noted above, FIG. 21 shows the inclusion of an extra two piece mounting collar that includes pieces 2101 & 2102, which may be added to enhance the security of the mounting collar 1801 and 1802. One or more of these auxiliary mounting collars may be used, and may be coupled together with bolts (that either do or do not connect into the wall).

Referring now to FIG. 22, a side view 2200 of one of the parallel bars 1805$x$ (e.g., 1805A—1805I) of a bar screen according to at least one embodiment is shown and described hereafter in more detail. The bar 1805X may have a front bar section 2205 that is attached to and at, for example, approximately a 45 degree angle to a lateral bar section 2210. The angle of inclination of the front bar section 2205 may be set at an angle in the range of approximately 90 degree to approximately 30 degrees as needed to get a desired debris retention and/or flushing through the plurality of parallel bars. The lateral bar section 2210 may be coupled to a back mounting section 2225. The outer lower surface may include a front bar underneath 2211, a later length section 2012. The mounting section 2225 may include a plurality of channels or stacked grooves 2010 (grooves or channels 2003 and 2004) that enable secure mating with, for example, a receiver bar 1803 including in the mounting bracket (see FIG. 21). The bar may have a back surface 2250 of the mounting section 2225, that may abut the front surface of the mounting bracket or mounting collar when the bar screen is seated or placed in the receiving area of the mounting collar and coupled to the channel(s) 2010, so that the bar screen does not move in a circular motion about the mounting receiver bar 1803. The lateral bar 1805$x$ may have an inside or a basin portion 2230 (with other bars forms a catch basin for debris) that may have a front inner angled surface 2231, and lower floor surface 2232, a back wall inner surface 2233, and another angled back surface 2234 (having approximately a 45 degree angle that may vary from, for example 30 degrees to almost 90 degrees) that act as the catch surface for the bar in the basin of the bar screen, so as to catch the undesired inorganic debris. It is noteworthy that in this embodiment the back portion 2225 of the bar 1805$x$ has a inward sloping or non vertical surface 2234 so that debris goes sliding down this surface and onto the basin floor surface 2232, and does not back up or form a dam to the outlet pipe 102 the bar screen is couple to. The front inner angled surface helps ensure that the undesired inorganic debris is held in the basin of the bar screen while organic debris may be washed away and not dammed up. The bar 1805$x$ may also include a rounded from surface 2240 that reduces debris from catching on that edge of the bar and help reduce breakage of the bar is the bas screen is dropped. The bar may also include interconnection holes 2255A—2244E that accommodate the bolts or threaded bars to interconnect the plurality of bars 1805$x$ that make up the interior lower surface of the basin of the bar screen. One skilled in the art would appreciate that the bar 1805$x$ design may vary in a number of ways without changing the intent of the bar screen design. Also, one skilled in the art appreciates that the multiple part bar screen may be made as a single molded piece of material, rather than having to use spaces and bolts for holding the plurality of bars 1805x together.

Some of the benefits to the present invention are the bar screens are generally smaller than those presently so that the lift station does not need to be significantly altered or requiring a different size, shape or configuration to the typical, standard, or pre-packaged lift station dimensions or design. As such, the present invention debris retention and removal mechanism may be quickly and easily installed in each and every lift station with relatively low cost. The debris retention and removal system may be installed, one per inlet pipe, by a person of little construction skill or knowledge, e.g., a lift station maintenance person with a power drill and/or screw driver, wrench, or socket and ratchet. The invention may also be added to each new inlet pipe as the number of inlet pipes in a lift station may be expanded over time, such that the lift station pumps remain protected from debris problems at a relatively low cost at any time, without requiring extensive and expensive construction cost to alter the fundamental design or size of the lift station to accommodate much larger and more intrusive debris removal systems (e.g., large motor driven bar screens or large dimension basket, rail, and crane configurations).

While embodiments of the invention have been described above, it is evident that many alternatives, modifications and variations will be apparent to those skilled in the art. For example, other types of material could be considered for the screen and/or mounting and bracketing mechanisms described herein. In various applications, the screen may be configured in a number of different manners, but which do not allow the undesirable debris from falling into the lift station basin or tank while allowing the waste water and sewage to pass, while still having low cost and ease of installation and cleaning. Accordingly, the embodiments of the invention, as set forth above, are intended to be illustrative, and should not be construed as limitations on the scope of the invention. Various changes may be made without departing from the spirit and scope of the invention. Accordingly, the scope of the present invention should be determined not by the embodiments illustrated above, but by the claims appended hereto and their legal equivalents.

What I claim is:

1. A removable bar screen apparatus for removing debris from a stream of fluid, comprising:
    a bar screen attached to an inlet pipe with a band, wherein the band is placed around and contacting at least a portion of an outside surface of the inlet pipe, so that the bar screen is supported by the inlet pipe, wherein the bar screen includes a plurality of straight spaced apart bars with upper surfaces that form a platform or floor for debris to fall into.

2. The apparatus of claim 1,
    wherein the bar screen further includes a front side portion of the spaced apart bars that is angled upward relative to at least the upper surfaces of the spaced apart bars and upward toward the level of a mouth of the inlet pipe, so as to keep debris from sliding off an end of the front side portion of the spaced apart bars.

3. The apparatus of claim 2, wherein the bar screen further comprises a left side wall and a right side wall that are perpendicular to and rise above the straight spaced apart bars' upper surfaces so as to restrict debris from falling off the left and right side of the bar screen.

4. The apparatus of claim 1, further comprising:
    a block; and
    a tang coupled to or formed integral to the block.

5. The apparatus of claim 1, further including a means for grasping, removing and returning the screen from below the inlet pipe using a handle.

6. The apparatus of claim 1, wherein the bar screen further includes: (1) a front side portion that is angled upward relative to a bottom upper surface of the plurality of straight spaced apart bars so as to keep debris from sliding off an end of the plurality of straight spaced apart bars; and (2) has at least three sides that includes two vertical sides that are approximately parallel to each other and approximately perpendicular to the platform or floor of the plurality of straight spaced apart shorter bars, the straight spaced apart bars being spaced apart and located between the two vertical sides.

7. The apparatus of claim 1, wherein the bar screen is made of a material selected from a group consisting of high density plastic, polyvinyl chloride (PVC), acrylonitrile butadiene styrene (ABS), high density polyethylene (HDPE), and polycarbonate resin.

8. The apparatus of claim 1, further comprising:
    a block; and
    wherein the band is a circular band coupled to the block and securely mounted to the inlet pipe.

9. A removable quick connect/disconnect debris screening and catching apparatus for quickly and easily removing debris from an inlet source of a basin, comprising:
    a screen removably connected to and below an inlet pipe of a lift station such that the screen may be removed, cleaned, and returned to below the inlet pipe of the lift station, wherein the screen includes a plurality of straight spaced apart bars with upper surfaces that form a platform or floor for debris to fall into and a front side portion of the spaced apart bars that is angled upward relative to at least the upper surfaces of the spaced apart bars and upward toward the level of a mouth of the inlet pipe, so as to keep debris from sliding off an end of the length of the plurality of spaced apart bars; and
    a band placed around and contacting at least a portion of an outside surface of the inlet pipe so that the screen is supported by the inlet pipe.

10. The apparatus of claim 9, wherein the screen includes a left side wall and a right side wall that are perpendicular to and rise above the straight spaced apart bars' upper surfaces so as to restrict debris from falling off a left and right side of the screen.

11. The apparatus of claim 10, wherein the screen further includes a means for grasping, removing and returning the screen from below the inlet pipe, the means for grasping, removing and returning the screen is located above the screen.

12. The apparatus of claim 11, further comprising:
    a mount that the bar screen and the band are removably attached to, wherein the band placed around and contacting at least a portion of an outside surface of the inlet pipe, surrounds the inlet pipe.

13. The apparatus of claim 11, wherein the means for grasping, removing and returning the screen from below the inlet pipe includes a hole into which a hook on a pole may be inserted to lift the screen off the inlet pipe and out of the lift station to be cleaned and returned to connect to the inlet pipe for further screening of debris entering the lift station from the inlet pipe.

14. The apparatus of claim 9, further comprising a means coupled to the screen for grasping, lifting, removing the screen from below the inlet pipe to clean off debris from the screen and returning the screen to be located below the inlet pipe for further debris removal, the means for grasping, removing and returning the screen is located above the screen.

15. The apparatus of claim 9, wherein the band connecting to the inlet pipe for mounting the screen to the inlet pipe, and is securely attached to and completely surrounds the inlet pipe.

16. A waste water and/or storm water debris retention and removal apparatus, comprising:
 a basin;
 a bar screen;
 an inlet pipe extending into an open area of the basin; and
 a band placed around and contacting at least a portion of an outside surface of the inlet pipe, so that the bar screen is supported at least in part by the inlet pipe, wherein the bar screen is oriented in a horizontal position relative to a vertical wall of the basin and located below a mouth of the inlet pipe.

17. The apparatus of claim 16, further comprising:
 a means for grasping, removing and returning the bar screen from below the inlet pipe.

18. The apparatus of claim 16, further comprising a means for grasping, removing and returning the bar screen from below the inlet pipe includes a hole into which a hook on a pole may be inserted to lift the screen off the inlet pipe and out of the lift station to be cleaned and returned to connect to the inlet pipe for further screening of debris entering the basin from the inlet pipe.

19. The apparatus of claim 18, wherein the band is a circular band securely mounted to the inlet pipe or the band is a band clamp securely mounted to the inlet pipe, and the bar screen is removably attached to the inlet pipe and supported by the band around at least a portion of the outside surface of the inlet pipe.

20. The apparatus of claim 16, further comprising;
 a mounting bracket including
  a mount that the bar screen is removably attached to, and wherein the band is a circular collar coupled to the mount and the inlet pipe, or a band clamp securely mounting the mount to the inlet pipe.

* * * * *